(12) United States Patent  (10) Patent No.: US 12,148,949 B2
Huang et al.  (45) Date of Patent: Nov. 19, 2024

(54) BATTERY, BATTERY MODULE, BATTERY PACK AND ELECTRIC DEVICE

(71) Applicant: CONTEMPORARY AMPEREX TECHNOLOGY (HONG KONG) LIMITED, Hong Kong (CN)

(72) Inventors: Yuping Huang, Ningde (CN); Mingfeng Lin, Ningde (CN); Yunjian Ma, Ningde (CN); Honggang Yu, Ningde (CN); Yanhui Li, Ningde (CN); Jianping Zhang, ningde (CN); Yu Dai, Ningde (CN); Yidong Shen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 159 days.

(21) Appl. No.: 17/937,768

(22) Filed: Oct. 3, 2022

(65) Prior Publication Data

US 2023/0117614 A1   Apr. 20, 2023

Related U.S. Application Data

(63) Continuation of application No. PCT/CN2021/108971, filed on Jul. 28, 2021.

(51) Int. Cl.
*H01M 50/414* (2021.01)
*H01M 4/36* (2006.01)
(Continued)

(52) U.S. Cl.
CPC ......... *H01M 50/414* (2021.01); *H01M 4/364* (2013.01); *H01M 4/386* (2013.01);
(Continued)

(58) Field of Classification Search
CPC .. H01M 50/414; H01M 50/457; H01M 4/364; H01M 4/386; H01M 4/505; H01M 4/525; H01M 4/583
(Continued)

(56) References Cited

U.S. PATENT DOCUMENTS

2009/0123826 A1* 5/2009 Nitzan ................ H01M 50/409
429/144
2013/0260207 A1* 10/2013 Uemura ............ H01M 10/4235
521/134
(Continued)

FOREIGN PATENT DOCUMENTS

CN  103247819 A  8/2013
CN  109698354 A  * 4/2019  ........ H01M 10/0525
(Continued)

OTHER PUBLICATIONS

Notice of Reasons of Refusal received in the counterpart Japanese application 2022-550822, mailed on Sep. 26, 2023.
(Continued)

*Primary Examiner* — James M Erwin
*Assistant Examiner* — John S Medley
(74) *Attorney, Agent, or Firm* — Kilpatrick Townsend & Stockton LLP

(57) ABSTRACT

A battery, a battery module, a battery pack and an electric device are provided. In some embodiments, the battery includes: a positive electrode, a separator and a negative electrode, wherein the separator includes a base film, a first coating provided on a first surface of the base film, and a second coating provided on a second surface of the base film, the first coating includes a first polar substance, and hydrogen bonds are formed between the first polar substance and a positive binder; hydrogen bonds are formed between the second polar substance and a negative binder and/or a
(Continued)

negative active component. In the present disclosure, binding forces between the separator and the positive electrode and the negative electrode may be increased by the hydrogen bonds, thus reducing a cycle expansion rate of a bare cell and improving a high-rate discharge performance and a cycle performance of the battery.

16 Claims, 3 Drawing Sheets

(51) Int. Cl.
    *H01M 4/38*     (2006.01)
    *H01M 4/505*     (2010.01)
    *H01M 4/525*     (2010.01)
    *H01M 4/583*     (2010.01)
    *H01M 50/457*     (2021.01)

(52) U.S. Cl.
    CPC ........... *H01M 4/505* (2013.01); *H01M 4/525* (2013.01); *H01M 4/583* (2013.01); *H01M 50/457* (2021.01)

(58) Field of Classification Search
    USPC .......................................................... 429/144
    See application file for complete search history.

(56) References Cited

U.S. PATENT DOCUMENTS

| | | | | |
|---|---|---|---|---|
| 2014/0295248 A1* | 10/2014 | Hotta | .................... | H01M 4/622 |
| | | | | 429/211 |
| 2014/0322587 A1* | 10/2014 | Lai | ..................... | H01M 50/446 |
| | | | | 427/126.4 |
| 2015/0303479 A1* | 10/2015 | Min | ..................... | H01M 4/622 |
| | | | | 106/162.7 |
| 2016/0365558 A1 | 12/2016 | Kia et al. | | |
| 2017/0365837 A1* | 12/2017 | Nietling | .............. | H01M 50/296 |
| 2018/0191021 A1* | 7/2018 | Kim | ........................ | H01M 4/525 |
| 2019/0267596 A1 | 8/2019 | Guo et al. | | |
| 2019/0355953 A1* | 11/2019 | Nam | .................... | H01M 50/491 |
| 2021/0288383 A1* | 9/2021 | Hong | ................... | C09D 127/16 |
| 2022/0094016 A1* | 3/2022 | Wang | ................ | H01M 10/0525 |

FOREIGN PATENT DOCUMENTS

| | | | | | |
|---|---|---|---|---|---|
| CN | 109792020 A | | 5/2019 | | |
| CN | 109841783 A | | 6/2019 | | |
| CN | 110197922 A | | 9/2019 | | |
| CN | 111370761 A | | 7/2020 | | |
| CN | 111403664 A | | 7/2020 | | |
| CN | 112928386 A | * | 6/2021 | ........ | H01M 10/0525 |
| EP | 3503256 A1 | | 6/2019 | | |
| JP | 2018137140 A | | 8/2018 | | |
| KR | 10-2008-0073969 A | | 8/2008 | | |
| KR | 20140124321 A | * | 10/2014 | .......... | H01M 10/052 |
| KR | 20200126820 A | * | 11/2020 | .......... | H01M 10/052 |
| WO | WO-2017029902 A1 | * | 2/2017 | ............. | H01G 11/38 |
| WO | WO-2019049510 A1 | * | 3/2019 | ............. | H01M 2/16 |
| WO | 2020141684 A1 | | 7/2020 | | |
| WO | 2020206097 A1 | | 10/2020 | | |
| WO | WO-2021120857 A1 | * | 6/2021 | .......... | H01M 10/052 |

OTHER PUBLICATIONS

International Search Report received in PCT Application PCT/CN2021/114463 on Mar. 2, 2022.
Written Opinion received in PCT Application PCT/CN2021/114463 on Mar. 2, 2022.
Notice of opinion submission received in the counterpart Korean application 10-2022-7029101, mailed on Jul. 18, 2024.
Extended European search report received in the counterpart European application 21927065.9, mailed on May 21, 2024.

\* cited by examiner

BATTERY, BATTERY MODULE, BATTERY PACK AND ELECTRIC DEVICE

CROSS-REFERENCE TO RELATED APPLICATION

This application is a continuation of International Application PCT/CN2020/108971, filed Jul. 28, 2021, and entitled "BATTERY, BATTERY MODULE, BATTERY PACK AND ELECTRIC DEVICE", which is incorporated herein by reference in its entirety.

TECHNICAL FIELD

The present disclosure relates to the field of lithium battery technologies, and particularly to a battery, a battery module, a battery pack and an electric device.

BACKGROUND ART

In recent years, as lithium ion batteries have a more and more extensive disclosure range, the lithium ion batteries are widely applied to energy storage power systems, such as hydraulic power stations, thermal power stations, wind power stations, solar power stations, or the like, and to a plurality of fields, such as electric tools, electric bicycles, electric motorcycles, electric automobiles, military equipment, aerospace, or the like. Due to a great development of the lithium ion battery, higher requirements are also put forward for an energy density, a group margin, a cycle/rate performance, a safety performance, or the like, of the lithium ion battery.

In addition, a separator is one of components of the battery, and may effectively prevent an internal short circuit caused by contact between a positive electrode and a negative electrode. However, the traditional separator is not connected with the positive electrode or the negative electrode by hydrogen bonds, and is only in physical contact with the positive electrode or the negative electrode, such that a bare cell is prone to expansion, which does not facilitate shaping of the cell. Therefore, the existing battery still needs to be improved.

SUMMARY

The present disclosure is made in view of the above problem, and an object thereof is to provide a battery to further improve an overall performance (high-rate discharge performance and cycle performance) of the battery.

In order to achieve the above object, the present disclosure provides a battery, a battery module, a battery pack and an electric device.

A first aspect of the present disclosure provides a battery, including: a positive electrode, a separator and a negative electrode, wherein the separator includes a base film, a first coating provided on a first surface of the base film, and a second coating provided on a second surface of the base film, the first coating includes a first polar substance, the first polar substance includes one or more of polyolefin amide substances, polyolefin imine substances, polyolefin oxide substances, polyurethane substances and polyurea substances, and hydrogen bonds are formed between the first polar substance and a positive binder of the positive electrode; the second coating includes a second polar substance, the second polar substance includes one or more of polyolefin amide substances, polyolefin imine substances, polyolefin oxide substances, polyurethane substances and polyurea substances, and hydrogen bonds are formed between the second polar substance and a negative binder and/or a negative active component of the negative electrode.

In the present disclosure, the hydrogen bond may be represented by X—H—Y, and X and Y may be one independently selected from N, O and F. The hydrogen bond is easy to form between the positive binder (containing —X) and the first polar substance (containing —YH); similarly, the hydrogen bond is also easy to form between the negative binder and/or the negative active component (containing —HX) and the second polar substance (containing —YH). Therefore, in the present disclosure, binding forces between the separator and the positive electrode and the negative electrode are increased by the hydrogen bonds, thus reducing expansion of a bare cell in a processing process and a cycle expansion rate after several cycles, improving a high-rate discharge capacity of the battery, shortening a lithium ion transport path, and improving a cycle performance of the battery.

In any embodiment, a peeling force between the first coating and the positive electrode is not lower than 0.075N, In some embodiments 0.075N-0.125N; a peeling force between the second coating and the negative electrode is not lower than 0.075N, In some embodiments 0.075N-0.15N. Thus, the binding forces between the separator and the positive electrode and the negative electrode may be characterized by the peeling forces. When the peeling force is within the reasonable range, the bare cell is not prone to expansion in the processing process and a cycle process, the separator is in close contact with the positive electrode and the negative electrode, and the battery has a strong high-rate discharge capability.

In any embodiment, a mass content $w_1$ of the first polar substance in the first coating and a mass content $m_1$ of the positive binder in a positive film layer have a ratio $$\frac{w1}{m1}$$

of (80-100):1; a mass content $w_2$ of the second polar substance in the second coating and a mass content $m_2$ of the negative binder in a negative film layer have a ratio $$\frac{w2}{m2}$$

of (32-50):1. Thus, by limiting numerical values of $$\frac{w1}{m1}$$

and $$\frac{w2}{m2}$$

within the reasonable ranges, an optimal ratio of a performance to a cost of the battery may be considered, and the high-rate discharge capacity and the cycle performance of the battery may be improved.

In any embodiment, the mass content $w_1$ of the first polar substance in the first coating and the mass content $w_2$ of the second polar substance in the second coating have a ratio $$\frac{w1}{w2}$$

of 1:(1-1.3). Thus, by limiting $$\frac{w1}{w2}$$

within the reasonable range, tension on two sides of the separator may be consistent to prevent a risk of a short circuit inside the battery caused by inconsistent tension, and the cycle performance of the battery may be improved.

In any embodiment, the first polar substance has a mass content $w_1$ of 80%-90% in the first coating, and the positive binder has a mass content $m_1$ of 0.9%-1.2% in the positive film layer. The second polar substance has a mass content $w_2$ of 80%-90% in the second coating, and the negative binder has a mass content $m_2$ of 2%-3% in the negative film layer. Thus, the battery has both the good high-rate discharge performance and cycle performance by limiting the above parameters within the reasonable ranges.

In any embodiment, the first polar substance includes polyethylene oxide and polyacrylamide; the polyethylene oxide and the polyacrylamide have a mass ratio C1 of (2-6):1. The second polar substance includes polyethylene imine and polyethylene oxide; the polyethylene imine and the polyethylene oxide have a mass ratio C2 of (2-6):1. Thus, in the first polar substance, a small number of polyacrylamide long-chain molecules are mixed in the polyethylene oxide, thus improving cycle stability of the battery. In the second polar substance, a small amount of low-cost polyethylene oxide is added into the polyethylene imine with high polarity, and hydrogen bonds are also formed between the polyethylene imine and the polyethylene oxide, which further increases a binding force in the second polar substance, thereby further improving the high-rate discharge performance and the cycle performance of the battery.

In any embodiment, the first coating includes a first reinforcing agent, and the mass content $w_1$ of the first polar substance in the first coating and a mass content $k_1$ of the first reinforcing agent in the first coating have a mass ratio $$\frac{w1}{k1}$$

of (5-9):1; the second coating includes a second reinforcing agent, and the mass content $w_2$ of the second polar substance in the second coating and a mass content $k_2$ of the second reinforcing agent in the second coating have a mass ratio $$\frac{w2}{k2}$$

of (5-9):1. Thus, by limiting the ratio of the first polar substance to the first reinforcing agent and the ratio of the second polar substance to the second reinforcing agent on the separator within the reasonable ranges respectively, hydrogen bonds may be formed between the first reinforcing agent and the first polar substance and between the second reinforcing agent and the second polar substance respectively, such that the bare cell is compacted more tightly in the processing process, the cycle expansion rate of the bare cell is low after plural charging and discharging cycles, and the high-rate discharge performance and the cycle performance of the battery are improved.

In any embodiment, the mass content $k_1$ of the first reinforcing agent in the first coating is not higher than the mass content $k_2$ of the second reinforcing agent in the second coating. Thus, by limiting $$\frac{k1}{k2}$$

within the reasonable range, the tension on the two sides of the separator may be kept consistent to prevent the short circuit inside the battery caused by inconsistent tension, and the cycle performance of the battery may be improved.

In any embodiment, the mass content $k_1$ of the first reinforcing agent in the first coating and the mass content $k_2$ of the second reinforcing agent in the second coating have a ratio $$\frac{k1}{k2}$$

of (0.8-1):1. Thus, by limiting the ratio of the mass content of the reinforcing agent in the first coating to the mass content of the reinforcing agent in the second coating within the reasonable range, there exist small influences on lithium ion transport dynamics in a charging and discharging process while stability of the separator is improved, and the cycle performance and the high-rate discharge performance of the battery are improved.

In any embodiment, the first reinforcing agent or the second reinforcing agent includes one or more of polyvinylidene difluoride and sodium alginate. The positive binder includes polyvinylidene fluoride, and the negative binder includes more than one of styrene butadiene rubber and sodium alginate.

In any embodiment, the negative active component includes a silicon-carbon mixture, silicon in the silicon-carbon mixture has a particle size of 0.1-0.5 microns, carbon in the silicon-carbon mixture is mixed carbon of artificial graphite and natural graphite, and the silicon-carbon mixture has a content of 95%-97% in the negative film layer. Thus, the cycle performance of the battery may be better by limiting the particle size of the silicon within the reasonable range, and the high-rate charging-discharging performance of the battery may be achieved by limiting the content of the silicon-carbon mixture in the negative film layer within the reasonable range.

In any embodiment, the first coating and the second coating have a mass ratio of 1:(1-1.5). Thus, by limiting coating quantities of the first coating and the second coating within reasonable ranges, the tension of the separator may be consistent to prevent the risk of the short circuit caused by inconsistent tension, and the cycle performance of the battery may be improved.

In any embodiment, the first coating is prepared from first coating slurry, and the first coating slurry includes the first polar substance, the first reinforcing agent and a first solvent; the first coating slurry has viscosity of 8,000 mpa·s-12,000 mpa·s. The second coating is prepared from second coating slurry, and the second coating slurry includes the second polar substance, the second reinforcing agent and a second solvent; the second coating slurry has viscosity of 5,000 mpa·s-20,000 mpa·s. Thus, by limiting the viscosity of the first coating slurry and the viscosity of the second coating slurry within the proper ranges respectively, a coating process of the first coating slurry or the second coating slurry on the base film may be optimized, a coating effect may be improved, consistency of the cell may be guaranteed to be good, and the cycle performance and the high-rate discharge performance of the battery may be improved.

In any embodiment, the positive electrode includes a positive material $LiNi_xCo_yMn_zO_2$, where x+y+z=1, and x=0.5-0.9, In some embodiments, x=0.5-0.7 or x=0.8-0.9. The separator in the present disclosure especially has a remarkable improvement effect on the cycle expansion rate of the bare cell containing a high-nickel positive material, and especially, the separator in the present disclosure more remarkably improves the cycle expansion rate of the bare cell containing the positive material with a nickel content x=0.5-0.7, and therefore more remarkably improves the high-rate discharge performance and the cycle performance of a high nickel battery.

A second aspect of the present disclosure provides a battery module, including the battery according to the first aspect of the present disclosure.

A third aspect of the present disclosure provides a battery pack, including the battery module according to the second aspect of the present disclosure.

A fourth aspect of the present disclosure provides an electric device, including at least one of the battery according to the first aspect of the present disclosure, the battery module according to the second aspect of the present disclosure, and the battery pack according to the third aspect of the present disclosure.

Compared with a prior art, the present invention has the following beneficial effects.

In the present disclosure, the hydrogen bonds are formed between the first polar substance and the positive binder, thus increasing the binding force between the separator and the positive electrode. The hydrogen bonds are formed between the second polar substance and the negative binder and/or a negative active substance, thus increasing the binding force between the separator and the negative electrode. The hydrogen bonds are formed between the first polar substance and the first reinforcing agent, thus increasing the binding force between the first coating and the base film of the separator. The hydrogen bonds are formed between the second polar substance and the second reinforcing agent, thus increasing the binding force between the second coating and the base film of the separator. Thus, with the present disclosure, expansion of the bare cell in the processing process may be improved, the cycle expansion rate of the bare cell in the cycle process may be reduced, and shaping of the bare cell is facilitated, such that the bare cell is more compact, and the high-rate discharge performance and the cycle performance of the battery are improved.

Figure 1:
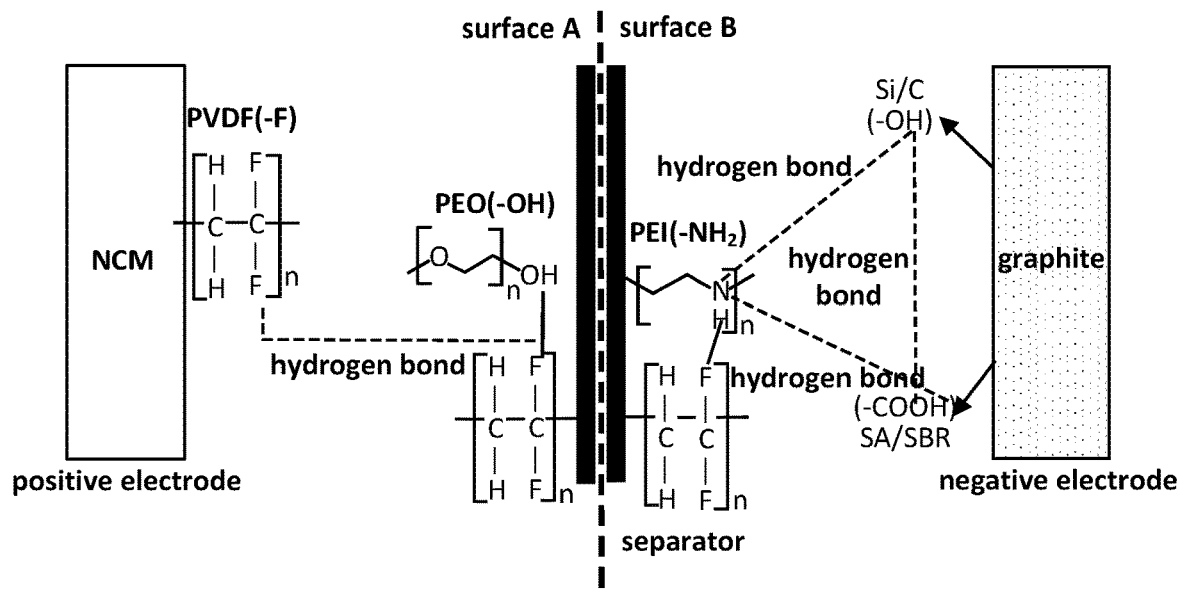
FIG. 1 is a schematic diagram of a reaction principle of formation of hydrogen bonds between a polar substance on a separator and a positive electrode and a negative electrode.

REFERENCE NUMERALS 1, battery pack; 2, upper box; 3, lower box; 4, battery module; 5, secondary battery; 51, housing; 52, electrode assembly; 53, top cover assembly

DETAILED DESCRIPTION OF EMBODIMENTS

Hereinafter, embodiments which specifically disclose a battery, a battery module, a battery pack and an electric device according to the present disclosure will be described in detail with reference to the accompanying drawings as appropriate. However, unnecessary detailed descriptions may be omitted in some cases. For example, detailed descriptions of well-known matters and repetitive descriptions of actually same structures may be omitted. This is for avoiding unnecessary and redundant description in the following, and facilitating the understanding of the person skilled in the art. Furthermore, the drawings and the following description are provided for those skilled in the art to fully understand the present disclosure, and are not intended to limit the subject matter recited in the claims.

A "range" disclosed herein is defined in terms of lower and upper limits, with a given range being defined by selecting one lower limit and one upper limit which define boundaries of the particular range. The ranges defined in this way may be inclusive or exclusive, and may be arbitrarily combined; that is, any lower limit may be combined with any upper limit to form a range. For example, if ranges of 60-120 and 80-110 are listed for a particular parameter, it is understood that ranges of 60-110 and 80-120 are also contemplated. Furthermore, if listed minimum range values are 1 and 2, and listed maximum range values are 3, 4, and 5, the following ranges are all contemplated; 1-3, 1-4, 1-5, 2-3, 2-4, and 2-5. In the present disclosure, unless stated otherwise, a numerical range of "a-b" represents a shorthand representation of any combination of real numbers between a and b, both a and b being real numbers. For example, a numerical range of "0-5" indicates that all real numbers between "0 and 5" are listed herein, and "0-5" is only a shorthand representation of a combination of these numbers. In addition, when a parameter is expressed to be an integer greater than or equal to 2, the expression equivalently discloses that the parameter is, for example, an integer of 2, 3, 4, 5, 6, 7, 8, 9, 10, 11, 12, or the like.

All embodiments and optional embodiments of the present disclosure may be combined with each other to form new technical solutions, unless otherwise specified.

All technical features and optional technical features of the present disclosure may be combined with each other to form new technical solutions, unless otherwise specified.

All steps of the present disclosure may be performed sequentially or randomly, preferably sequentially, unless otherwise specified. For example, the method includes steps (a) and (b), which means that the method may include steps (a) and (b) performed sequentially or steps (b) and (a) performed sequentially. For example, the expression that the method may further include step (c) means that step (c) may be added to the method in any order; for example, the method may include steps (a), (b) and (c), or steps (a), (c) and (b), or steps (c), (a) and (b), or the like.

The terms "include" and "contain" mentioned herein are either open or closed, unless otherwise specified. For example, the terms "include" and "contain" may mean that additional components not listed may also be included or contained, or only listed components may be included or contained.

In the present disclosure, the term "or" is inclusive, unless otherwise specified. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

With long-term experience for fabrication of lithium ion batteries, the inventor of the present disclosure finds that: on the one hand, in a processing process, a positive electrode, a separator and a negative electrode are wound and compacted into a bare cell, and although the bare cell is compacted in the processing process, after a period of time, the bare cell tends to bounce, resulting in expansion of the bare cell. On the other hand, in a cycle process, a negative active material (for example, graphite) has increased lattice, and graphite flakes have increased interlayer spacing, which may cause an increase of a thickness of the bare cell, resulting in the expansion of the bare cell.

Based on the above-mentioned two reasons for the expansion of the bare cell, the bare cell may generate bubbles after the expansion, which damages interface stability of internal mechanisms of the cell, presses an electrolyte to an edge of an electrode plate, and thus causes a lithium precipitation problem. In addition, after expanding, the bare cell has a decreased group margin, and an aluminum shell is pressed to be deformed, thus reducing a cycle capability of the battery, accelerating cycle attenuation, and reducing a high-rate discharge performance.

After lots of experiments and researches, the inventor(s) finds that inhibition of an influence of the expansion of the bare cell on the performance of the battery may be started with the following ideas: in a first aspect, a surface of a base film of a separator may be coated with a polar substance, and hydrogen bonds may be formed between the polar substance and a positive binder and a negative binder or a negative active substance, so as to increase binding forces between the separator and a positive electrode and a negative electrode. In another aspect, some reinforcing agents may be mixed into the polar substance to increase the binding force of the separator. Therefore, starting from cooperation of the two actions, by comprehensively modifying the separator and fully and cooperatively utilizing the above-mentioned two actions, the inventor designs a battery in which the binding forces between the separator and the positive electrode and the negative electrode may be increased remarkably, the expansion of the bare cell in the processing process and a cycle expansion rate in the cycle use process are reduced, and the high-rate discharge performance and the cycle performance of the battery are improved greatly.

Battery

In one embodiment in accordance with the present disclosure provides a battery.

The battery includes: a positive electrode, a separator, a negative electrode and an electrolyte, wherein the separator includes a base film, a first coating provided on a first surface of the base film, and a second coating provided on a second surface of the base film:

the first coating includes a first polar substance, the first polar substance includes one or more of polyolefin amide substances, polyolefin imine substances, polyolefin oxide substances, polyurethane substances and polyurea substances, and hydrogen bonds are formed between the first polar substance and a positive binder of the positive electrode; and the second coating includes a second polar substance, the second polar substance includes one or more of polyolefin amide substances, polyolefin imine substances, polyolefin oxide substances, polyurethane substances and polyurea substances, and hydrogen bonds are formed between the second polar substance and a negative binder and/or a negative active component of the negative electrode.

In the present disclosure, the first coating on the separator is a structure with a preset thickness including the first polar substance, and may be firmly bound to the positive binder by the first polar substance, thus preventing expansion of a bare cell in a processing process and a cycle expansion rate in a cycle use process.

Further, the first polar substance, such as polyolefin amide, polyolefin imine, polyolefin oxide, polyurethane, polyurea, or the like, includes polar functional groups, and on the one hand, hydrogen bonds may be formed between the polar functional groups and the positive binder to increase a binding force between the first coating and the positive electrode; on the other hand, the first polar substance is a binder, and may also increase the binding force between the first coating and the positive electrode. Therefore, the first coating and the positive electrode are more firmly bound under the two actions of the polar functional group in the first polar substance and the first polar substance which is a binder.

In this embodiment, the first polar substance in the present disclosure has a YH group, and Y is one of N, O and F. The positive binder has an X group, and X is one of N, O and F. Herein, a hydrogen bond X—H—Y may be formed between the positive binder having the X group and the YH group in the first polar substance in the present disclosure, thereby more firmly binding the first coating and the positive electrode in the present disclosure. More specifically, as shown in FIG. 1, for example, the positive binder contains F, such that the hydrogen bond is easy to form between the positive binder and the first polar substance (—OH).

In the present disclosure, the second coating of the separator is a structure with a preset thickness including the second polar substance, and may be firmly bound to the negative binder and/or the negative active substance by the second polar substance, thus preventing the expansion of the bare cell in the processing process and the cycle expansion rate in the cycle use process.

Further, the second polar substance, such as polyolefin amide, polyolefin imine, polyolefin oxide, polyurethane, polyurea, or the like, includes polar functional groups, and on the one hand, hydrogen bonds may be formed between the polar functional groups and the negative binder and/or the negative active substance to increase a binding force between the second coating and the negative electrode; on the other hand, the second polar substance is a binder, and may also increase the binding force between the second coating and the negative electrode. Therefore, the second coating and the negative electrode are more firmly bound under the two actions of the polar functional group in the second polar substance and the second polar substance which is a binder.

In this embodiment, the second polar substance in the present disclosure has a YH group, and Y is one of N, O and F. The negative binder and/or the negative active component have/has a —HX group, and X is one of N, O and F; herein, a hydrogen bond X—H—Y may be formed between the negative binder and/or the negative active component having the X group and the YH group in the second polar substance in the present disclosure, thereby more firmly binding the second coating and the negative electrode in the present disclosure. More specifically, as shown in FIG. 1, the negative electrode contains —OH/—COOH; for example, the negative active substance contains —OH, the negative binder contains —COOH, and therefore, the hydrogen bond is also easy to form between the negative active substance or the negative binder and the second polarity substance (containing —NH$_2$).

In the present disclosure, in the first coating and the second coating of the separator, the binding forces between the separator and the positive electrode and the negative electrode may be increased by the hydrogen bonds respectively, so as to reduce the expansion of the bare cell in the processing process and the circle expansion rate in the cycle use process, facilitate shaping of the bare cell, and make the bare cell more compact, thereby shortening a transport path of lithium ions, more quickly transporting the lithium ions, and thus making the high-rate discharge performance and the cycle performance of the battery better.

In some embodiments, a peeling force between the first coating and the positive electrode is not lower than 0.075N, In some embodiments 0.075N-0.125N. A peeling force between the second coating and the negative electrode is not lower than 0.075N, In some embodiments 0.075N-0.15N.

Usually, the peeling force is a maximum force required to peel a unit width of materials pasted together from a contact surface. The peeling force may reflect binding strength of the materials. For a detailed test method for the peeling force, reference may be made to a test method part in the example. Specifically, in the present disclosure, existence and strength of the hydrogen bonds between the separator and the positive electrode and the negative electrode may be macroscopically reflected by the peeling force, so as to reflect the binding force between the separator and the positive electrode and the negative electrode.

After verification by a lot of experiments, those skilled in the art learn that the peeling force between the separator (if the first coating does not contain the first polar substance) and the positive electrode is usually less than 0.035N, and at this point, the separator and the positive electrode have a small binding force, and no or quite few hydrogen bonds exist, but in the present disclosure, after a test of the peeling force between a surface of the positive electrode and the coating of the separator, it is unexpectedly found that the peeling force between the first coating and the positive electrode is not less than 0.075N by adding the first polar substance into the first coating, which may thus further prove that the hydrogen bonds are formed between the first polar substance and the positive binder. In addition, those skilled in the art learn that the peeling force between the separator (if the second coating does not contain the second polar substance) and the negative electrode is also usually less than 0.035N, and at this point, the separator and the negative electrode have a small binding force, and no or quite few hydrogen bonds exist. But in the present disclosure, after a test of the peeling force between a surface of the negative electrode and the coating of the separator, it is unexpectedly found that the peeling force between the second coating and the negative electrode is not less than 0.075N by adding the second polar substance into the second coating, which may further prove that the hydrogen bonds are formed between the second polar substance and the negative binder or the negative active component.

In the present disclosure, when the peeling force between the first coating and the positive electrode or the peeling force between the second coating and the negative electrode is not less than 0.075N, the bare cell is not prone to expansion in the processing process and the cycle use process, and the separator is in closer contact with the positive electrode and the negative electrode, which shortens the transport path of the lithium ions, such that the lithium ions may be transported more quickly, resulting in the better high-rate discharge performance and cycle performance of the battery.

In some embodiments, a mass content $w_1$ of the first polar substance in the first coating and a mass content $m_1$ of the positive binder in a positive film layer may have a ratio $$\frac{w1}{m1}$$

of (80-100):1.

In the present disclosure, $$\frac{w1}{m1}$$

may reflect a relative content relationship between the first polar substance and the positive binder in the separator.

Further, when $$\frac{w1}{m1}$$

is less than 80:1, on the one hand, few hydrogen bonds are possibly formed between the first polar substance and the positive binder due to the excessively low content of the first polar substance in the first coating, and the first polar substance has an insufficient binding force, such that the first coating and the positive binder cannot be bound firmly, and thus, the expansion problem of the bare cell in the processing process and the cycle process cannot be well solved. On the other hand, an electron transport channel may be blocked by the positive binder with an excessively high content, and furthermore, the positive binder is usually an inert insulator and has poor conductivity and large polarization, thus influencing the cycle performance and the high-rate discharge performance of the battery.

Further, when $$\frac{w1}{m1}$$

is greater than 100:1, on the one hand, possibly due to the first polar substance having an excessively high content, first, the base film is prone to blockage, thus reducing air permeability and affecting a dynamic performance of the separator; second, the first polar substance is prone to fall from the base film in the middle and later periods of a cycle, thus deteriorating the cycle performance and the high-rate discharge performance. On the other hand, the positive binder with an excessively low content may cause insufficient viscosity, and therefore, the positive electrode and the first coating have a small binding force.

Therefore, a numerical value of $$\frac{w1}{m1}$$

within the reasonable range may reduce the expansion of the bare cell in the processing process and the cycle use process, and improve the high-rate discharge performance and the cycle performance of the battery.

In some embodiments, the mass content $w_1$ of the first polar substance in the first coating and the mass content $m_1$ of the positive binder in the positive film layer have a ratio $$\frac{w1}{m1}$$

of 80:1, 87:1, 93:1, 97:1, 100:1, or the like.

$$\frac{w1}{m1}$$

may be any above-mentioned point value or any range of values between the point values.

A mass content $w_2$ of the second polar substance in the second coating and a mass content $m_2$ of the negative binder in a negative film layer may have a ratio $$\frac{w2}{m2}$$

of (32-50):1.

In the present disclosure, $$\frac{w2}{m2}$$

may reflect a relative content relationship between the second polar substance and the negative binder in the separator.

Further, when $$\frac{w2}{m2}$$

is less than 32:1, on the one hand, few hydrogen bonds are possibly formed between the second polar substance and the negative binder due to the excessively low content of the second polar substance in the second coating, and the second polar substance has an insufficient binding force, such that the second coating and the negative binder cannot be bound firmly, and thus, the expansion problem of the bare cell in the processing process and the cycle process cannot be well solved. On the other hand, an electron transport channel may be blocked by the negative binder with an excessively high content, and furthermore, the negative binder is usually an inert insulator and has poor conductivity and large polarization, thus influencing the cycle performance and the high-rate discharge performance of the battery.

Further, when $$\frac{w2}{m2}$$

is greater than 50:1, on the one hand, possibly due to an excessively high content, the second polar substance is prone to fall in the middle and later periods of a cycle, thus deteriorating the cycle performance and the high-rate discharge performance. On the other hand, the negative binder with an excessively low content may cause insufficient viscosity, and therefore, the negative electrode and the second coating have a small binding force.

Therefore, a numerical value of $$\frac{w2}{m2}$$

within the reasonable range may reduce the expansion of the bare cell in the processing process and the cycle process, and improve the high-rate discharge performance and the cycle performance of the battery.

In some embodiments, the mass content $w_2$ of the second polar substance in the second coating and the mass content $m_2$ of the negative binder in the negative film layer may have a ratio $$\frac{w2}{m2}$$

of 32:1, 36:1, 40:1, 45:1, 50:1, or the like.

$$\frac{w2}{m2}$$

may be any above-mentioned point value or any range of values between the point values.

In some embodiments, the mass content $w_1$ of the first polar substance in the first coating and the mass content $w_2$ of the second polar substance in the second coating may have a ratio $$\frac{w1}{w2}$$

of 1:(1-1.3).

In the present disclosure, $$\frac{w1}{w2}$$

of the polar substances with which two surfaces of the separator are coated.

In the present disclosure, by limiting $$\frac{w1}{w2}$$

within the reasonable range, the separator may have consistent tension and be more stable, which may, on the one hand, prevent a short circuit risk caused by inconsistent tension, and on the other hand, improve the cycle performance and the high-rate discharge performance of the battery. If $$\frac{w1}{w2}$$

is less than 1:1 or $$\frac{w1}{w2}$$

is greater than 1:1.3, two surfaces of the separator have inconsistent tension, the separator is wrinkled, bubbles are generated on the surface, immersion by the electrolyte is not good, lithium is prone to precipitation, the cycle performance is deteriorated, cycle attenuation is accelerated, and the high-rate discharge performance is deteriorated.

In some embodiments, the mass content $w_1$ of the first polar substance in the first coating and the mass content $w_2$ of the second polar substance in the second coating have a ratio $$\frac{w1}{w2}$$

of 1:1, 1:1.3, or the like.

$$\frac{w1}{w2}$$

may be any above-mentioned point value or any range of values between the point values.

Usually, coating quantities of the first polar substance and the second polar substance cannot be different greatly and are In some embodiments basically equal, i.e., $$\frac{w1}{w2} = 1,$$

which may ensure that the two surfaces of the separator may have substantially same bearing capabilities, and the battery may have the better cycle performance and high-rate discharge performance.

In some embodiments, the first polar substance may have a mass content $w_1$ of 80%-90% in the first coating.

In the present disclosure, $w_1$ may reflect the content of the first polar substance in the first coating.

In the present disclosure, the first polar substance accounts for a main part in the first coating, which may increase the hydrogen bonds between the first polar substance and the positive binder, such that the first coating and the positive electrode have a better binding force. If the first polar substance has a content lower than 80% in the first coating and few hydrogen bonds are generated between the first polar substance and the positive binder, a binding performance between the separator and the positive electrode is improved limitedly, and an expansion improvement effect of the bare cell in the processing process and the cycle use process is not obvious; if the first polar substance has a content higher than 90% in the first coating, the base film is prone to blockage, thus reducing the air permeability and influencing the dynamic performance of the separator.

In some embodiments, the first polar substance has a mass content $w_1$ of 80%, 85%, 90%, or the like, in the first coating. $W_1$ may be any above-mentioned point value or any range of values between the point values.

In some embodiments, the positive binder may have a mass content $m_1$ of 0.9%-1.2% in the positive film layer.

In the present disclosure, $m_1$ may reflect the content of the positive binder in the positive film layer.

When $m_1$ is within this range, the positive electrode and the first coating may be bound firmly, thereby reducing the expansion of the bare cell in the processing process or the cycle use process, and improving the high-rate discharge performance and the cycle performance of the battery. Usually, the positive binder cannot have an excessively large content in a positive plate, and when $m_1$ is greater than 1.2%, the electron transport channel may be blocked by the positive binder with an excessively high content, and in addition, the positive binder is usually an inert insulator and has poor conductivity and large polarization, thus influencing the cycle performance and the high-rate discharge performance of the battery. Usually, the positive binder also cannot have an excessively small content in the positive plate, and when $m_1$ is less than 0.9%, the positive binder with an excessively low content may cause insufficient viscosity, and therefore, the positive electrode and the first coating have a small binding force.

In some embodiments, the positive binder may have a mass content $m_1$ of 0.9%, 1%, 1.2%, or the like, in the positive film layer. $M_1$ may be any above-mentioned point value or any range of values between the point values.

Thus, by limiting the above parameters $w_1$, $m_1$ within the reasonable ranges, the dynamic performance and the binding force between the first coating and the positive electrode may be considered, and an optimal ratio therebetween may be obtained, thus improving the high-rate discharge performance and the cycle performance of the battery.

In some embodiments, the second polar substance may have a mass content $w_2$ of 80%-90% in the second coating.

In the present disclosure, $w_2$ may reflect the content of the second polar substance in the second coating.

In the present disclosure, the second polar substance accounts for a main part in the second coating, which may increase the hydrogen bonds between the second polar substance and the negative binder, such that the second coating and the negative electrode have a better binding force. If the second polar substance has a content lower than 80% in the second coating and few hydrogen bonds are generated between the second polar substance and the negative binder, a binding performance between the separator and the negative electrode is improved limitedly, and an expansion improvement effect of the bare cell in the processing process and the cycle use process is not obvious; if the second polar substance has a content higher than 90% in the second coating, the base film is prone to blockage, thus reducing the air permeability and influencing the dynamic performance of the separator.

In some embodiments, the second polar substance has a mass content $w_2$ of 80%, 85%, 90%, or the like, in the second coating. $W_2$ may be any above-mentioned point value or any range of values between the point values.

In some embodiments, the negative binder may have a mass content $m_2$ of 2%-3% in the negative film layer.

In the present disclosure, $m_2$ may reflect the content of the negative binder in the negative film layer.

In the present disclosure when $m_2$ is within this range, the negative electrode and the second coating may be bound firmly, thereby reducing the expansion of the bare cell in the processing process or the cycle use process, and improving the high-rate discharge performance and the cycle performance of the battery. Usually, the negative binder cannot have an excessively large content in a negative plate, and when $m_1$ is greater than 3%, the electron transport channel may be blocked by the negative binder with an excessively high content, and in addition, the negative binder is usually an inert insulator and has poor conductivity and large polarization, thus influencing the cycle performance and the high-rate discharge performance of the battery. Usually, the negative binder also cannot have an excessively small content in the negative plate, and when $m_1$ is less than 2%, the negative binder with an excessively low content may cause insufficient viscosity, and therefore, the negative electrode and the second coating have a small binding force.

In some embodiments, the negative binder may have a mass content $m_2$ of 2%, 2.6%, 3%, or the like, in the negative film layer. $m_2$ may be any above-mentioned point value or any range of values between the point values.

Thus, by limiting the above parameters $w_2$, $m_2$ within the reasonable ranges, the dynamic performance and the binding force between the second coating and the negative electrode may be considered, and an optimal ratio therebetween may be obtained, thus improving the high-rate discharge performance and the cycle performance of the battery.

In some embodiments, the first polar substance includes polyethylene oxide and polyacrylamide. The polyethylene oxide and the polyacrylamide may have a mass ratio C1 of (2-6):1.

Usually, different polar substances may achieve different functions, and thus, advantages of the substances may be combined. Specifically, in the present disclosure, in the first active substance, the polyethylene oxide is a lithium ion conductor, has characteristics of high conductivity, low activation energy, most negative electrode potential, or the like, may accelerate conduction of the lithium ions, and is required to account for a main part in the first polar substance. Since the polyacrylamide has a large chain length, a large molecular weight, and good thermal stability compared with the polyethylene oxide (PEO), and a surface connected with the positive electrode is usually oxidized at a high pressure, mixture of a small number of long chain molecules, such as the polyacrylamide, or the like, in the polyethylene oxide, particularly within the range defined in the present disclosure, may improve cycle stability and the high-rate discharge performance of the battery.

Further, if the polyethylene oxide and the polyacrylamide have a mass ratio C1 less than 2:1, since the polyacrylamide is not a lithium ion conductor, a lithium ion conduction rate is low, thus influencing the cycle performance and the high-rate discharge performance of the battery. If the polyethylene oxide and the polyacrylamide have a mass ratio C1 greater than 6:1, the polyacrylamide has an excessively low content, resulting in poor thermal stability.

In some embodiments, the polyethylene oxide and the polyacrylamide may have a mass ratio C1 of 2:1, 3:1, 4.5:1, 5:1, 6:1, or the like. C1 may be any above-mentioned point value or any range of values between the point values.

The second polar substance includes polyethylene imine and polyethylene oxide. The polyethylene imine and the polyethylene oxide may have a mass ratio C2 of (2-6):1.

Usually, different polar substances may achieve different functions, and thus, advantages of the substances may be combined. Specifically, in the present disclosure, in the second active substance, both the polyethylene imine and the polyethylene oxide are lithium ion conductors, have characteristics of high conductivity, low activation energy, most negative electrode potential, or the like, and may accelerate conduction of the lithium ions. Furthermore, the second active substance is located on a side connected with the negative electrode, and since the negative active substance, such as graphite, is prone to expansion, a binder with high polarity, such as polyethylene imine (PEI) is required to be selected; in addition, since polyethylene oxide is cheaper than polyethylene imine, a small amount of polyethylene oxide may be added into polyethylene imine in consideration of a cost factor, particularly within the range defined by the present disclosure, such that the hydrogen bonds may be formed between the polyethylene oxide and the polyethylene imine while the cost is reduced, thus further increasing the binding force, reducing the expansion of the bare cell in the processing and cycle use processes, and improving the cycle performance and the high-rate discharge performance of the battery.

If the polyethylene imine and the polyethylene oxide have a mass ratio C2 less than 2:1, since the polyethylene imine has high polarity, when the content is excessively low, few hydrogen bonds are formed between the second polar substance and the negative binder or the negative active substance, and the second coating and the negative electrode have a reduced binding force, thus increasing the expansion of the bare cell in the processing process and the cycle use process, and influencing the cycle performance and the high-rate discharge performance of the battery. If the polyethylene imine and the polyethylene oxide have a mass ratio C2 greater than 6:1, a cost is increased.

In some embodiments, the polyethylene imine and the polyethylene oxide may have a mass ratio C2 of 2:1, 3:1, 4.5:1, 5:1, 6:1, or the like. C2 may be any above-mentioned point value or any range of values between the point values.

In some embodiments, for example, polyamide may be one or a combination of more of polyacrylamide (PAM), nylon-66, nylon-6, or the like, in the first or second polar substance. The polyamide may have a weight-average molecular weight of 20,000-80,000, In some embodiments 20,000, 30,000, 40,000, 50,000, 60,000, 70,000, 80,000, or the like, and the weight-average molecular weight of the polyamide may be any above-mentioned point value or any range of values between the point values.

In some embodiments, for example, the polyolefin imine may be one or more of polyethylene imine (PEI), polyethylene polyamine, or the like, in the first or second polar substance. The polyolefin imine may have a weight-average molecular weight of 70,000-100,000, In some embodiments 70,000, 80,000, 90,000, 100,000, or the like, and the weight-average molecular weight of the polyolefin imine may be any above-mentioned point value or any range of values between the point values.

In some embodiments, for example, the polyolefin oxide may be polyethylene oxide (PEO), or the like, in the first or second polar substance. The polyolefin oxide may have a weight-average molecular weight of 100,000-200,000, In some embodiments 100,000, 120,000, 140,000, 160,000, 180,000, 200,000, or the like, and the weight-average molecular weight of the polyolefin oxide may be any above-mentioned point value or any range of values between the point values.

In some embodiments, in the first or second polar substance, for example, the polyurethane may be a polymer with a general formula containing —NHCOO—, and more specifically, the polyurethane may be formed by polymerizing at least one monomer of polyisocyanate, toluene diisocyanate (TDI), methylenediphenyl-4,4'-diisocyanate (MDI), polyarylpolymethylene isocyanate (PAPI), or by copolymerizing two or more monomers, the polymerization including random copolymerization, block copolymerization, or the like. The polyurethane may have a weight-average molecular weight of 1,000-10,000, In some embodiments 1,000, 5,000, 10,000, or the like, and the weight-average molecular weight of the polyurethane may be any above-mentioned point value or any range of values between the point values.

In some embodiments, in the first or second polar substance, the polyurea may be, for example, a polymer with a general formula containing —NHCONH—, and more specifically, may be one or more of polyurea, urea-formaldehyde resin, or the like. The polyurea may have a weight-average molecular weight of 5,000-50,000, In some embodiments 5,000, 10,000, 20,000, 30,000, 40,000, 50,000, or the like, and the weight-average molecular weight of the polyurea may be any above-mentioned point value or any range of values between the point values.

In some embodiments, the first coating includes a first reinforcing agent, and the mass content $w_1$ of the first polar substance in the first coating and a mass content $k_1$ of the first reinforcing agent in the first coating may have a mass ratio $$\frac{w1}{k1}$$

of (5-9):1.

In the present disclosure, $$\frac{w1}{k1}$$

reflects a content relationship between the first reinforcing agent and the first polar substance.

In the present disclosure, since the first polar substance has a risk of separation from the base film in the middle or late period of the cycle of the battery, the binding force of the first polar substance on the base film may be enhanced by the first reinforcing agent. Only when the ratio of the first polar substance to the first reinforcing agent on the separator is within the reasonable range, the expansion of the bare cell in the processing process and the cycle expansion rate in the cycle use process may be reduced, and the cycle performance and the high-rate discharge performance of the battery may be improved. When $$\frac{w1}{k1}$$

is greater than 9:1, the first polar substance has an excessively high content, first, the base film is prone to blockage, thus reducing air permeability and affecting the dynamic performance of the separator; second, the first polar substance is prone to fall from the base film in the middle and later periods of the cycle, thus deteriorating the cycle performance and the high-rate discharge performance. When $$\frac{w1}{k1}$$

is less than 5:1, the first polar substance has an excessively low content in the first coating, and thus, few hydrogen bonds are formed between the first polar substance and the positive binder, and the first polar substance has an insufficient binding force, such that the first coating and the positive binder cannot be bound firmly, and thus, the expansion problem of the bare cell in the processing process and the cycle use process cannot be well solved.

Further, by analyzing a mechanism of forming the hydrogen bond between the first reinforcing agent and the first polar substance, since the hydrogen bond Y—H—F is easily formed between the first reinforcing agent (containing F) and the first polar substance (—YH), the first polar substance may stably exist on the separator by the first reinforcing agent, thereby reducing the expansion of the bare cell in the processing process and the cycle expansion rate in the cycle use process, and improving the cycle performance and the high-rate discharge performance of the battery.

In some embodiments, the mass content $w_1$ of the first polar substance in the first coating and the mass content k1 of the first reinforcing agent in the first coating may have a mass ratio $$\frac{w1}{k1}$$

of 5:1, 5.3:1, 6:1, 8:1, 9:1, or the like.

$$\frac{w1}{k1}$$

may be any above-mentioned point value or any range of values between the point values.

In some embodiments, the second coating includes a second reinforcing agent, and the mass content $w_2$ of the second polar substance in the second coating and a mass content $k_2$ of the second reinforcing agent in the second coating may have a mass ratio $$\frac{w2}{k2}$$

of (5-9):1.

In the present disclosure, $$\frac{w2}{k2}$$

reflects a content relationship between the second reinforcing agent and the second polar substance.

In the present disclosure, since the second polar substance has a risk of separation from the base film in the middle or late period of the cycle of the battery, the binding force of the second polar substance on the base film may be enhanced by the second reinforcing agent. Only when the ratio of the second polar substance to the second reinforcing agent on the separator is within the reasonable range, the expansion of the bare cell in the processing process and the cycle expansion rate in the cycle use process may be reduced, and the cycle performance and the high-rate discharge performance of the battery may be improved. When $$\frac{w2}{k2}$$

is greater than 9:1, the second polar substance has an excessively high content and is prone to fall in the middle and later periods of the cycle, thus deteriorating the cycle performance and the high-rate discharge performance. When $$\frac{w2}{k2}$$

is less than 5:1, the second polar substance has an excessively low content in the second coating, and thus, few hydrogen bonds are formed between the second polar substance and the negative binder, and the second polar substance has an insufficient binding force, such that the second coating and the negative binder cannot be bound firmly, and thus, the expansion problem of the bare cell in the processing process and the cycle use process cannot be well solved.

Further, by analyzing a mechanism of forming the hydrogen bond between the second reinforcing agent and the second polar substance, the hydrogen bond Y—H—F is easily formed between the second reinforcing agent (containing F) and the second polar substance (—YH), and the second polar substance may stably exist on the separator by the second reinforcing agent, thereby reducing the expansion of the bare cell in the processing process and the cycle expansion rate in the cycle use process, and improving the cycle performance and the high-rate discharge performance of the battery.

In some embodiments, the mass content $w_2$ of the second polar substance in the second coating and the mass content $k_2$ of the second reinforcing agent in the second coating may have a mass ratio $$\frac{w2}{k2}$$

of 5:1, 5.3:1, 6:1, 8:1, 9:1, or the like.

$$\frac{w2}{k2}$$

may be any above-mentioned point value or any range of values between the point values.

In some embodiments, the mass content $k_1$ of the first reinforcing agent in the first coating is not higher than the mass content $k_2$ of the second reinforcing agent in the second coating.

In the present disclosure, $k_1$ and $k_2$ may reflect contents of the reinforcing agents with which the two surfaces of the separator are coated, and $k_1$ and $k_2$ cannot be significantly different.

Usually, when $k_1$ is not higher than $k_2$, the tension of the separator may be kept consistent, and the separator is more stable, which may, on the one hand, prevent the short circuit risk caused by inconsistent tension, and on the other hand, improve the cycle performance and the high-rate discharge performance of the battery. If $k_1$ is significantly different from $k_2$, the two surfaces of the separator have inconsistent tension, the separator is wrinkled, bubbles are generated on the surface, immersion by the electrolyte is not good, lithium is prone to precipitation, the cycle performance is deteriorated, cycle attenuation is accelerated, and the high-rate discharge performance is deteriorated.

In some embodiments, the mass content $k_1$ of the first reinforcing agent in the first coating and the mass content $k_2$ of the second reinforcing agent in the second coating may have a ratio $$\frac{k1}{k2}$$

of (0.8-1):1.

In the present disclosure, $$\frac{k1}{k2}$$

may reflect the relative contents of the reinforcing agents on the two surfaces of the separator. Thus, by defining the proper ratio of the reinforcing agents, stability of the separator may be improved, and meanwhile, there exist small influences on lithium ion transport dynamics, and the cycle performance and the high-rate discharge performance of the battery may be improved. If $$\frac{k1}{k2}$$

is less than 0.8:1 or $$\frac{k1}{k2}$$

is greater than 1:1, the two surfaces of the separator have inconsistent tension, the separator is wrinkled, bubbles are generated on the surface, immersion by the electrolyte is not good, lithium is prone to precipitation, the cycle performance is deteriorated, cycle attenuation is accelerated, and the high-rate discharge performance is deteriorated.

Preferably, the two surfaces of the separator have basically consistent contents, which may reduce a difference of the two surfaces of the separator.

In some embodiments, the mass content $k_1$ of the first reinforcing agent in the first coating and the mass content $k_2$ of the second reinforcing agent in the second coating may have a ratio $\frac{k1}{k2}$ of 0.80:1, 0.9:1, 0.95:1, 1:1, or the like.

$\frac{k1}{k2}$ may be any above-mentioned point value or any range of values between the point values.

In some embodiments, the first reinforcing agent may have a mass content $k_1$ of 10%-20% in the first coating. The second reinforcing agent may have a mass percentage content $k_2$ of 10%-20% in the second coating.

In the present disclosure, $k_1$ may reflect the content of the reinforcing agent in the first coating. $k_2$ may reflect the content of the second reinforcing agent in the second coating.

In the present disclosure, the content of the first reinforcing agent in the first coating cannot be significantly different from the content of the second reinforcing agent in the second coating; if $k_1$ is significantly different from $k_2$, the two surfaces of the separator have inconsistent tension, the separator is wrinkled, bubbles are generated on the surface, immersion by the electrolyte is not good, lithium is prone to precipitation, the cycle performance is deteriorated, cycle attenuation is accelerated, and the high-rate discharge performance is deteriorated. Thus, by limiting the above parameters within the reasonable ranges, there may exist small influences on lithium ion transport dynamics while the stability of the separator is improved, dynamics and viscosity may be considered to obtain an optimal ratio, and the cycle performance and the high-rate discharge performance of the battery may be improved.

In some embodiments, the two surfaces of the separator have basically consistent contents, which may reduce the difference of the two surfaces of the separator; the separator has consistent tension and is prevented from being wrinkled.

In some embodiments, the first reinforcing agent may have a mass content $k_1$ of 14%, 16.6%, 18%, 19%, 20%, or the like, in the first coating. $K_1$ may be any above-mentioned point value or any range of values between the point values.

In some embodiments, the second reinforcing agent may have a mass percentage content $k_2$ of 10%, 11%, 14%, 15.8%, 16.6%, 17%, 20%, or the like, in the second coating. $k_2$ may be any above-mentioned point value or any range of values between the point values.

In some embodiments, the first reinforcing agent or the second reinforcing agent includes one or more of polyvinylidene difluoride and sodium alginate; due to a low cost, the polyvinylidene difluoride is preferred. The positive binder includes polyvinylidene fluoride. The negative binder includes more than one of styrene butadiene rubber and sodium alginate.

In some embodiments, the first or second reinforcing agent has a weight-average molecular weight of 500-600,000, In some embodiments 500, 10,000, 100,000, 200,000, 300,000, 400,000, 500,000, 600,000, or the like, and the weight-average molecular weight of the first or second reinforcing agent may be any above-mentioned point value or any range of values between the point values.

Further, the polyvinylidene difluoride may have a weight-average molecular weight of 100,000-600,000, In some embodiments 100,000, 200,000, 300,000, 400,000, 500,000, 600,000, or the like, and the weight-average molecular weight of the polyvinylidene difluoride may be any above-mentioned point value or any range of values between the point values.

Further, the sodium alginate may have a weight-average molecular weight of 500-50,000, In some embodiments 500, 10,000, 20,000, 30,000, 40,000, 50,000, or the like, and the weight-average molecular weight of the sodium alginate may be any above-mentioned point value or any range of values between the point values. The polyvinylidene difluoride and the sodium alginate may be applied to the first reinforcing agent, the second reinforcing agent, the positive binder or the negative binder.

In some embodiments, the first coating and the second coating may have a mass ratio of 1:(1-1.5).

In the present disclosure, the first coating and the second coating may reflect the contents of the coated substances on the two surfaces of the separator, and the two contents cannot be significantly different; thus, by limiting the coating quantities of the first coating and the second coating within the reasonable ranges, the separator may have consistent tension and is more stable, which may, on the one hand, prevent the short circuit risk caused by inconsistent tension, and on the other hand, improve the cycle performance and the high-rate discharge performance of the battery. If the contents of the first and second coatings are significantly different, the two surfaces of the separator have inconsistent tension, the separator is wrinkled, bubbles are generated on the surface, immersion by the electrolyte is not good, lithium is prone to precipitation, the cycle performance is deteriorated, cycle attenuation is accelerated, and the high-rate discharge performance is deteriorated.

In some embodiments, the first coating and the second coating may have a mass ratio of 1:1, 1:2, 1:3, 1:4, 1:5, or the like. The mass ratio of the first coating to the second coating may be any above-mentioned point value or any range of values between the point values.

In some embodiments, the first coating or the second coating may further include a filler which may be, for example, alumina, and the filler may improve heat resistance and stability of the coating, and when used in combination with the first polar substance, may reduce the expansion of the bare cell in the processing process and the cycle use process, and improve the cycle performance and the high-rate discharge performance of the battery. A content of the filler is not particularly limited; for example, the filler may have a mass proportion greater than 0% and less than or equal to 25% in the first or second coating. The filler in the first or second coating with a content greater than 25% may block pores of the base film, thus resulting in a slow ion transport rate and affecting the cycle performance and the high-rate discharge performance of the battery.

In some embodiments, the filler may have a mass percent of 3.2%, 8%, 10%, 15%, 18.9%, 20%, 25%, or the like, in the first or second coating. The mass percent of the filler in the first or second coating may be any above-mentioned point value or any range of values between the point values.

In some embodiments, the first coating is prepared from first coating slurry. The first coating slurry includes the first polar substance, the first reinforcing agent and a first solvent; the first coating slurry may have viscosity of 8,000 mpa·s-12,000 mpa·s.

In the present disclosure, the first coating slurry may be prepared using a method known in the art. For example, the first polar substance and the first reinforcing agent may be mixed in the first solvent to form uniform slurry, i.e., the first coating slurry, and In some embodiments, in the preparation process of the first coating slurry, the first polar substance, the first reinforcing agent and the filler may be mixed and then dissolved in the first solvent to prepare the first coating slurry. For quantities of the substances, reference may be made to the foregoing setting of the mass ratios of the components in the first coating in the present disclosure.

In the present disclosure, viscosity of the first coating slurry greatly influences coating and an electrochemical performance of the cell, and if the first coating slurry has excessively high viscosity, gel is prone to formation, and coating is uneven, resulting in poor consistency of the cell and reduction of the cycle performance and the high-rate discharge performance of the battery. If the first coating slurry has excessively low viscosity, the base film cannot be well coated with the first coating slurry. Thus, by limiting the viscosity of the first coating slurry within the proper range, the base film may be well coated with the first coating slurry, the consistency of the cell may be guaranteed to be good, and the cycle performance and the high-rate discharge performance of the battery may be improved.

In some embodiments, the first coating slurry may have viscosity of 8,000 mpa·s, 9,000 mpa·s, 10,000 mpa·s, 11,000 mpa·s, 12,000 mpa·s, or the like. A weight-average molecular weight of the first coating slurry may be any above-mentioned point value or any range of values between the point values.

Further, the first solvent is usually not limited, and more specifically, when the first reinforcing agent is sodium alginate, selection of the first solvent is not limited. When the first reinforcing agent is polyvinylidene difluoride, the first solvent is an organic solvent which may be, for example, N,N-dimethyl pyrrolidone, acetone, or the like.

In some embodiments, the second coating is prepared from second coating slurry, and the second coating may be prepared using a method known in the art. The second coating slurry includes the second polar substance, the second reinforcing agent and a second solvent; the second coating slurry has viscosity of 5,000 mpa·s-20,000 mpa·s.

In the present disclosure, the second coating slurry may be prepared using a method known in the art. For example, the second polar substance and the second reinforcing agent may be mixed in the second solvent to form uniform slurry, i.e., the second coating slurry, and In some embodiments, in the preparation process of the second coating slurry, the second polar substance, the second reinforcing agent and the filler may be mixed and then dissolved in the second solvent to prepare the second coating slurry. For quantities of the substances, reference may be made to the foregoing setting of the mass ratios of the components in the second coating in the present disclosure.

In the present disclosure, viscosity of the second coating slurry greatly influences coating and an electrochemical performance of the cell, and if the second coating slurry has excessively high viscosity, gel is prone to formation, and coating is uneven, resulting in poor consistency of the cell and reduction of the cycle performance and the high-rate discharge performance of the battery. If the second coating slurry has excessively low viscosity, the base film cannot be well coated with the second coating slurry. Thus, by limiting the viscosity of the second coating slurry within the proper range, the base film may be well coated with the second coating slurry, the consistency of the cell may be guaranteed to be good, and the cycle performance and the high-rate discharge performance of the battery may be improved.

In some embodiments, the second coating slurry may have viscosity of 5,000 mpa·s, 8,000 mpa·s, 10,000 mpa·s, 13,000 mpa·s, 15,000 mpa·s, 18,000 mpa·s, 20,000 mpa·s, or the like. A weight-average molecular weight of the second coating slurry may be any above-mentioned point value or any range of values between the point values.

Further, the second solvent is usually not limited, and more specifically, when the second reinforcing agent is sodium alginate, selection of the second solvent is not limited. When the second reinforcing agent is polyvinylidene difluoride, the second solvent is an organic solvent which may be, for example, N,N-dimethyl pyrrolidone, acetone, or the like.

[Base Film]

In some embodiments, a type of the base film is not particularly limited in the present disclosure, and any well-known base film with a porous structure having good chemical stability and mechanical stability may be selected.

In some embodiments, the base film may be made of at least one of glass fibers, non-woven fabrics, polyethylene, polypropylene and polyvinylidene difluoride. The base film may be a single-layer film or a multi-layer composite film, which is not particularly limited. When the base film is a multi-layer composite film, respective layers may be made of same or different materials, which is not particularly limited.

[Negative Electrode]

The negative electrode includes a negative current collector and a negative film layer provided on at least one surface of the negative current collector, the negative film layer including a negative active component.

In some embodiments, the negative active component includes a silicon-carbon mixture, and silicon in the silicon-carbon mixture may have a particle size of 0.1-0.5 microns. Carbon is mixed carbon of artificial graphite and natural graphite.

In the present disclosure, the particle size of the silicon greatly influences an electrochemical performance, micron silicon has a smaller specific surface area and fewer side reactions than nanometer silicon, the battery has the better cycle performance and high-rate discharge performance, and therefore, micron silicon is selected.

In some embodiments, the silicon has a particle size of 0.1 microns, 0.3 microns, 0.5 microns, or the like. The particle size of the silicon may be any above-mentioned point value or any range of values between the point values.

In some embodiments, the silicon-carbon mixture may have C:Si of 95-97:3-5, or the like. More specifically, C:Si may be 95:5.

Further, the silicon-carbon mixture may have a content of 95%-97% in the negative film layer. Since the content of the silicon-carbon mixture affects an energy density of the cell, a high capacity of the battery may be realized only when the silicon-carbon mixture has a content greater than 95% in the negative film layer, so as to improve the cycle performance and the high-rate discharge performance of the battery.

In some embodiments, the silicon-carbon mixture may have a content of 95.9%, 96%, 96.7%, 96.8%, 97%, or the like, in the negative film layer. The content of the silicon-carbon mixture in the negative film layer may be any above-mentioned point value or any range of values between the point values.

In some embodiments, the negative active component may be a negative active material for a battery well known in the art. As an example, the negative active component may include at least one of the following materials: artificial graphite, natural graphite, soft carbon, hard carbon, silicon-based materials, tin-based materials, lithium titanate, or the like. The silicon-based material may be at least one of elemental silicon, a silicon-oxygen compound, a siliconnitrogen composite, and a silicon alloy. The tin-based material may be at least one of elemental tin, a tin-oxide compound, and a tin alloy. However, the present disclosure is not limited to these materials, and other conventional materials which may be used as the negative active component of the battery may be used. Only one of these negative active components may be used, or more than two thereof are used in combination.

As an example, the negative current collector has two surfaces opposite in a thickness direction thereof, and the negative film layer is provided on one or both of the two opposite surfaces of the negative current collector.

In some embodiments, metal foil or a composite current collector may be used as the negative current collector. For example, copper foil may be used as the metal foil. The composite current collector may include a high molecular material base layer and a metal layer formed on at least one surface of the high molecular material base layer. The composite current collector may be formed by forming a metal material (copper, a copper alloy, nickel, a nickel alloy, titanium, a titanium alloy, silver, a silver alloy, or the like) on the base layer of high molecular material (such as polypropylene (PP), polyethylene terephthalate (PET), poly butylene terephthalate (PBT), polystyrene (PS), polyethylene (PE), or the like).

In some embodiments, the negative film layer further In some embodiments includes a negative binder. The negative binder may be at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS). In some embodiments, the negative binder is styrene butadiene rubber (SBR) and sodium alginate (SA).

In some embodiments, the negative film layer further In some embodiments includes a conductive agent. The conductive agent may be at least one of superconducting carbon, acetylene black, carbon black, Ketjen black, carbon dots, carbon nanotubes, graphene, and carbon nanofibers.

In some embodiments, the negative film layer may further In some embodiments include other additives, such as a thickener (for example, sodium carboxymethyl cellulose (CMC-Na)), or the like.

In some embodiments, the negative electrode may be fabricated by: dispersing the above components for fabricating the negative electrode, such as the negative active component, the conductive agent, the binder, and any other component, in a solvent (for example, deionized water) to form negative slurry; and coating the negative current collector with the negative slurry, and performing drying, cold pressing and other processes to obtain the negative electrode.

[Positive Electrode]

The positive electrode includes a positive current collector and a positive film layer provided on at least one surface of the positive current collector, the positive film layer including a positive material according to the first aspect of the present disclosure.

In some embodiments, the positive electrode includes a positive material $LiNi_xCo_yMn_zO_2$, where $x+y+z=1$, and $x=0.5-0.9$, In some embodiments $x=0.5-0.7$ or $x=0.8-0.9$.

In the present disclosure, generally speaking, the positive material may have a nickel content greater than 0.5, but different positive system bare cells have different expansion changes, and the separator in the present disclosure especially has a remarkable improvement effect on the cycle expansion rate of the bare cell containing a high-nickel positive material.

More specifically, when the nickel content $x=0.5-0.7$, unit cell parameters of the positive material change greatly, the positive material also has a large volume change, and final expansion of the bare cell changes greatly compared with initial expansion thereof, but the obtained bare cell has a small cycle expansion rate, and in the present disclosure, within the aforementioned range, the cycle expansion rate of the bare cell is improved more remarkably, and a cycle conservation rate is better. When the nickel content is, for example, 0.8-0.9, although the unit cell parameters of the positive material have small changes, since the bare cell also has a small final cycle expansion rate, this nickel content is also within the scope claimed by the present disclosure.

In some embodiments, $x=0.4$, $x=0.5$, $x=0.6$, $x=0.7$, $x=0.8$, $x=0.9$, or the like, and the nickel content may be any above-mentioned point value or any range of values between the point values.

In some embodiments, the positive material may be $LiNi_{0.4}Co_{0.4}Mn_{0.2}O_2$, $LiNi_{0.5}Co_{0.2}Mn_{0.3}O_2$, $LiNi_{0.6}Co_{0.2}Mn_{0.2}O_2$, $LiNi_{0.7}Co_{0.2}Mn_{0.1}O_2$, $LiNi_{0.8}Co_{0.1}Mn_{0.1}O_2$, $LiNi_{0.9}Co_{0.05}Mn_{0.05}O_2$, or the like.

Further In some embodiments, the positive active material may be a positive active material for a battery well known in the art. As an example, the positive active material may include at least one of the following materials: lithium-contained phosphate of an olivine structure, lithium transition metal oxide and respective modified compounds thereof. However, the present disclosure is not limited to these materials, and other conventional materials which may be used as the positive active material of the battery may be used. Only one of these positive active materials may be used, or more than two thereof are used in combination. Examples of the lithium transition metal oxide may include, but are not limited to, at least one of lithium cobalt oxide (for example, $LiCoO_2$), lithium nickel oxide (for example, $LiNiO_2$), lithium manganese oxide (for example, $LiMnO_2$, $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (also abbreviated as $NCM_{333}$), $LiNi_{0.5}Co_{0.25}Mn_{0.25}O_2$ (also abbreviated as $NCM_{211}$), lithium nickel cobalt aluminum oxide (for example, $LiNi_{0.85}Co_{0.15}Al_{0.05}O_2$), and modified compounds thereof, or the like. Examples of the lithium-contained phosphate of an olivine structure may include, but are not limited to, at least one of lithium iron phosphate (for example, $LiFePO_4$ (also abbreviated as LFP)), a composite material of lithium iron phosphate and carbon, lithium manganese phosphate (for example, $LiMnPO_4$), a composite material of lithium manganese phosphate and carbon, lithium iron manganese phosphate, and a composite material of lithium iron manganese phosphate and carbon.

As an example, the positive current collector has two surfaces opposite in a thickness direction thereof, and the positive film layer is provided on one or both of the two opposite surfaces of the positive current collector.

In some embodiments, metal foil or a composite current collector may be used as the positive current collector. For example, aluminum foil may be used as the metal foil. The composite current collector may include a high molecular material base layer and a metal layer formed on at least one surface of the high molecular material base layer. The composite current collector may be formed by forming a metal material (aluminum, an aluminum alloy, nickel, a nickel alloy, titanium, a titanium alloy, silver, a silver alloy, or the like) on the base layer of high molecular material (such as polypropylene (PP), polyethylene terephthalate (PET), polybutylene terephthalate (PBT), polystyrene (PS), polyethylene (PE), or the like).

In some embodiments, the positive film layer further In some embodiments includes a positive binder. As an example, the positive binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethyleneterpolymer, a tetrafluoroethylene-hexafluoropropylene copolymer, and fluorine-contained acrylate resin. In some embodiments, the positive binder is polyvinylidene fluoride (PVDF).

In some embodiments, the positive film layer further In some embodiments includes a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode may be fabricated by: dispersing the above components for fabricating the positive electrode, such as the positive material, the conductive agent, the binder, and any other component, in a solvent (for example, N-methyl pyrrolidone) to form positive slurry; and coating the positive current collector with the positive slurry, and performing drying, cold pressing and other processes to obtain the positive electrode.

[Electrolyte]

The electrolyte plays a role of conducting ions between the positive plate and the negative plate. A type of the electrolyte is not particularly limited in the present disclosure and may be selected as desired. For example, the electrolyte may be in a liquid, gel, or all solid state.

In some embodiments, the electrolyte is an electrolyte solution. The electrolyte includes electrolyte salt and a solvent.

In some embodiments, the electrolyte salt may be at least one of lithium hexafluorophosphate, lithium tetrafluoroborate, lithium perchlorate, lithium hexafluoroarsenate, lithium bis-fluorosulfonylimide, lithium bis-trifluoromethanesulfonylimide, lithium trifluoromethanesulfonate, lithium difluorophosphate, lithium difluorooxalato borate, lithium dioxalato borate, lithium difluorobisoxalate phosphate, and lithium tetrafluorooxalato phosphate.

In some embodiments, the solvent may be at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte further In some embodiments includes an additive. For example, the additive may include a negative film layer forming additive and a positive film layer forming additive, and may further include an additive capable of improving certain performances of the battery, such as an additive for improving an overcharge performance of the battery, an additive for improving a high-temperature or low-temperature performance of the battery, or the like.

The battery according to the present disclosure is described below with reference to the drawings as appropriate.

One embodiment of the present disclosure provides a secondary battery. Usually, the secondary battery includes a positive electrode, a negative electrode, an electrolyte, and a separator. During a charging and discharging process of the battery, active ions are inserted and extracted back and forth between the positive electrode and the negative electrode. The electrolyte plays a role of conducting the ions between the positive electrode and the negative electrode. The separator is provided between a positive plate and a negative plate, mainly functions to prevent a short circuit of the positive electrode and the negative electrode, and meanwhile may allow the ions to pass.

In some embodiments, the positive electrode, the negative electrode and the separator may be manufactured into an electrode assembly with a winding process or a lamination process.

In some embodiments, the secondary battery may include an outer package. The outer package may be configured to encapsulate the electrode assembly and the electrolyte.

In some embodiments, the outer package of the secondary battery may be a hard shell, such as a hard plastic shell, an aluminum shell, a steel shell, or the like. The outer package of the secondary battery may also be a soft package, such as a bag-type soft package. The soft package may be made of plastic, such as polypropylene, polybutylene terephthalate, poly butylene succinate, or the like.

Figure 3:
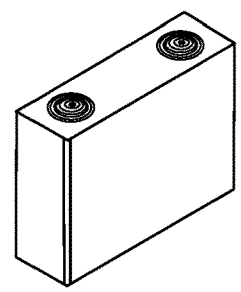
FIG. 3 is a schematic diagram of a secondary battery according to an embodiment of the present disclosure.

A shape of the secondary battery is not particularly limited in the present disclosure, and may be a cylindrical shape, a square shape, or any other shape. For example, FIG. 3 shows a secondary battery 5 of a square structure as an example.

Figure 4:
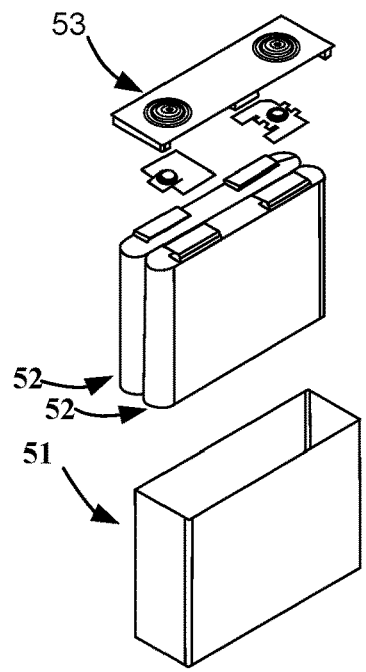
FIG. 4 is an exploded view of the secondary battery according to the embodiment of the present disclosure shown in FIG. 3.

In some embodiments, referring to FIG. 4, the outer package may include a housing 51 and a cover plate 53. The housing 51 may include a bottom plate and a side plate connected to the bottom plate, and the bottom plate and the side plate enclose an accommodating cavity. The housing 51 has an opening communicated with the accommodating cavity, and the cover plate 53 may cover the opening to close the accommodating cavity. The positive plate, the negative plate and the separator may form the electrode assembly 52 with a winding process or a lamination process. The electrode assembly 52 is encapsulated within the accommodating cavity. The electrolyte immerses the electrode assembly 52. One or more electrode assemblies 52 may be contained in the secondary battery 5, and those skilled in the art may make a choice according to specific practical requirements.

In addition, the battery module, the battery pack and the electric device according to the present invention will be described below with reference to the drawings as appropriate.

Battery Module

In some embodiments, the secondary batteries may be assembled into a battery module, one or more secondary batteries may be contained in the battery module, and the specific number may be selected by those skilled in the art according to an disclosure and a capacity of the battery module.

Figure 5:
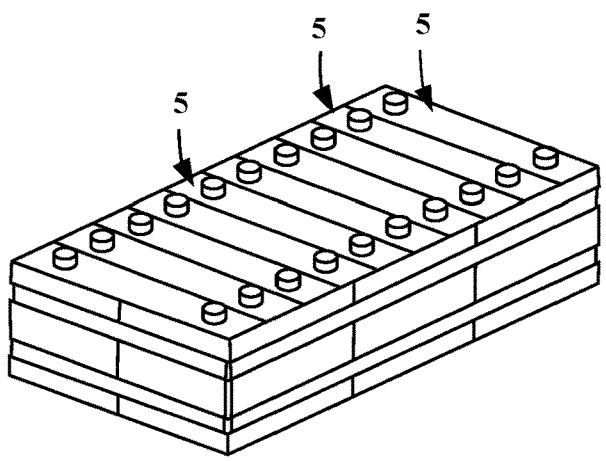
FIG. 5 is a schematic diagram of a battery module according to an embodiment of the present disclosure.

FIG. 5 shows a battery module 4 as an example. Referring to FIG. 5, a plurality of secondary batteries 5 may be sequentially arranged in the battery module 4 in a length direction of the battery module 4. Certainly, the secondary batteries 5 may be arranged in any other way. The plurality of secondary batteries 5 may be further fixed by fasteners.

In some embodiments, the battery module 4 may further include a casing having an accommodating space in which the plurality of secondary batteries 5 are accommodated.

Battery Pack

In some embodiments, the above-mentioned battery modules may be further assembled into a battery pack, one or more battery modules may be contained in the battery pack, and the specific number may be selected by those skilled in the art according to an disclosure and a capacity of the battery pack.

Figure 6:
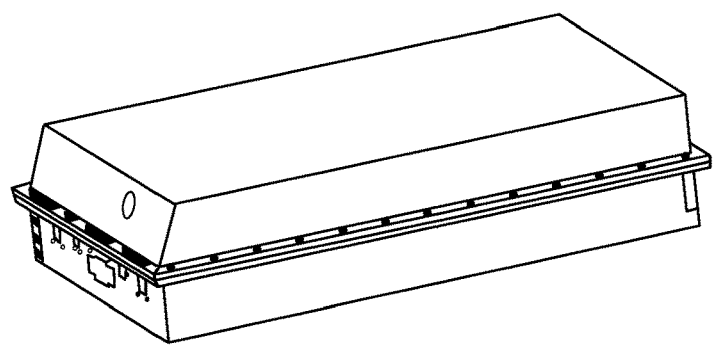
FIG. 6 is a schematic diagram of a battery pack according to an embodiment of the present disclosure.
Figure 7:
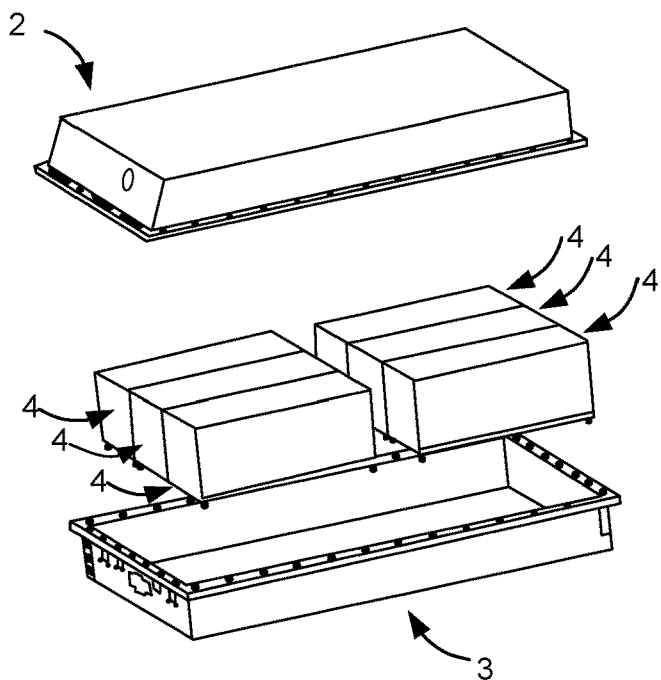
FIG. 7 is an exploded view of the battery pack according to the embodiment of the present disclosure shown in FIG. 6.

FIGS. 6 and 7 show a battery pack 1 as an example. Referring to FIGS. 6 and 7, the battery pack 1 may include a battery box and a plurality of battery modules 4 arranged in the battery box. The battery box includes an upper box 2 and a lower box 3, and the upper box 2 may cover the lower box 3 to form an enclosed space for accommodating the battery module 4. The plurality of battery modules 4 may be arranged in the battery box in any manner.

Electric Device

In addition, the present disclosure further provides an electric device, including at least one of the secondary battery, the battery module and the battery pack according to the present disclosure. The secondary battery, the battery module, or the battery pack may be used as a power source or an energy storage unit of the electric device. The electric device may include, but is not limited to, a mobile apparatus (for example, a mobile phone, a notebook computer, or the like), an electric vehicle (for example, a battery electric vehicle, a hybrid electric vehicle, a plug-in hybrid electric vehicle, an electric bicycle, an electric scooter, an electric golf cart, an electric truck, or the like), an electric train, a ship, a satellite, an energy storage system, or the like.

The secondary battery, the battery module, or the battery pack may be selected according to use requirements of the electric device.

Figure 8:
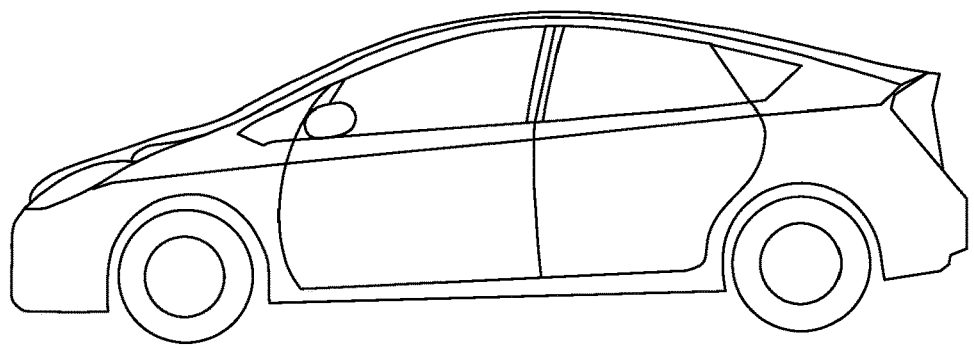
FIG. 8 is a schematic diagram of an electric device in which the secondary battery is used as a power source according to an embodiment of the present disclosure.

FIG. 8 shows an electric device as an example. The electric device is a battery electric vehicle, a hybrid electric vehicle, a plug-in hybrid electric vehicle, or the like. In order to meet demands of the electric device for high power and high energy density of the secondary battery, a battery pack or a battery module may be used.

As another example, the device may be a mobile phone, a tablet computer, a notebook computer, or the like. Usually, the device is required to be thin and light, and a secondary battery may be used as the power source thereof.

EXAMPLE

Hereinafter, examples of the present disclosure will be described. The examples described below are illustrative, and merely used to explain the present disclosure. The examples shall not be construed to limit the present disclosure. If the specific technologies or conditions are not specified in the examples, a step will be performed in accordance with the techniques or conditions described in the literature in the art or in accordance with the product instructions. The reagents or instruments used in the present invention, the manufacturers of which are not indicated, are the commercially available conventional products.

Example 1-1

1. Fabrication of Separator

1) A first polar substance PEO and alumina were dissolved in NMP according to a mass ratio of 80:20, the mixture was stirred to be even to obtain first coating slurry, and a surface A of a PE base film (surface of the PE base film close to a positive electrode) was coated with the first coating slurry using a gravure coating method.

2) A second polar substance PEI and alumina were dissolved in deionized water according to a mass ratio of 80:20, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

2. Fabrication of Positive Electrode

A positive active substance $LiNi_{0.6}Co_{0.2}Mn_{0.2}O_2$, a positive binder PVDF and conductive carbon were mixed according to a mass ratio of 97:1.07:1.93 and dissolved in NMP, the mixture was stirred for 6 h to obtain positive slurry, aluminum foil was coated with the positive slurry, and drying and cold pressing were performed to obtain the positive electrode.

A mass content $w_1$ of the first polar substance in the first coating and a mass content $m_1$ of the positive binder in a positive film layer had a ratio $$\frac{w1}{m1}$$

of 75:1.

3. Fabrication of Negative Electrode

SA and SBR were mixed according to a mass ratio of 80:20 to obtain a negative binder, a negative active substance (carbon-silicon mixture (C:Si=95:5)), the negative binder and carbon nanotubes were mixed according to a mass ratio of 97:2.66:0.34 and dissolved in water, the mixture was stirred for 6 h to obtain negative slurry, copper foil was coated with the negative slurry, and drying and cold pressing were performed to obtain the negative electrode.

A mass content $w_2$ of the second polar substance in the second coating and a mass content $m_2$ of the negative binder in a negative film layer had a ratio $$\frac{w2}{m2}$$

of 30:1.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 1-2

For the fabrication process of the lithium ion battery, reference was overall made to example 1-1 except that the positive active substance $LiNi_{0.6}Co_{0.2}Mn_{0.2}O_2$, the positive binder PVDF and the conductive carbon had a mass ratio of 97:1:2, and the negative active substance (carbon-silicon mixture), the negative binder and the carbon nanotubes had a mass ratio of 97:2.5:0.5.

The mass content $w_1$ of the first polar substance in the first coating and the mass content $m_1$ of the positive binder in the positive film layer had a ratio $$\frac{w1}{m1}$$

of 80:1. The mass content $w_2$ of the second polar substance in the second coating and the mass content $m_2$ of the negative binder in the negative film layer had a ratio $$\frac{w2}{m2}$$

of 32:1.

Example 1-3

For the fabrication process of the lithium ion battery, reference was overall made to example 1-1 except that the positive active substance $LiNi_{0.6}Co_{0.2}Mn_{0.2}O_2$, the positive binder PVDF and the conductive carbon had a mass ratio of 97:0.91:2.09, and the negative active substance (carbon-silicon mixture), the negative binder and the carbon nanotubes had a mass ratio of 97:2.2:0.8.

The mass content $w_1$ of the first polar substance in the first coating and the mass content $m_1$ of the positive binder in the positive film layer had a ratio $$\frac{w1}{m1}$$

of 87:1. The mass content $w_2$ of the second polar substance in the second coating and the mass content $m_2$ of the negative binder in the negative film layer had a ratio $$\frac{w2}{m2}$$

of 36:1.

Example 1-4

For the fabrication process of the lithium ion battery, reference was overall made to example 1-1 except that the positive active substance $LiNi_{0.6}Co_{0.2}Mn_{0.2}O_2$, the positive binder PVDF and the conductive carbon had a mass ratio of 97:0.86:2.14, and the negative active substance (carbon-silicon mixture), the negative binder and the carbon nanotubes had a mass ratio of 97:2:1.

The mass content $w_1$ of the first polar substance in the first coating and the mass content $m_1$ of the positive binder in the positive film layer had a ratio $$\frac{w1}{m1}$$

of 93:1. The mass content $w_2$ of the second polar substance in the second coating and the mass content $m_2$ of the negative binder in the negative film layer had a ratio $$\frac{w2}{m2}$$

of 40:1.

Example 1-5

For the fabrication process of the lithium ion battery, reference was overall made to example 1-1 except that the positive active substance $LiNi_{0.6}Co_{0.2}Mn_{0.2}O_2$, the positive binder PVDF and the conductive carbon had a mass ratio of 97:0.82:2.18, and the negative active substance (carbon-silicon mixture), the negative binder and the carbon nanotubes had a mass ratio of 97:1.77:1.23.

The mass content $w_1$ of the first polar substance in the first coating and the mass content $m_1$ of the positive binder in the positive film layer had a ratio $$\frac{w1}{m1}$$

of 97:1. The mass content $w_2$ of the second polar substance in the second coating and the mass content $m_2$ of the negative binder in the negative film layer had a ratio $$\frac{w2}{m2}$$

of 45:1.

Example 1-6

For the fabrication process of the lithium ion battery, reference was overall made to example 1-1 except that the positive active substance $LiNi_{0.6}Co_{0.2}Mn_{0.2}O_2$, the positive binder PVDF and the conductive carbon had a mass ratio of 97:0.8:2.2, and the negative active substance (carbon-silicon mixture), the negative binder and the carbon nanotubes had a mass ratio of 97:1.6:1.4.

The mass content $w_1$ of the first polar substance in the first coating and the mass content $m_1$ of the positive binder in the positive film layer had a ratio $$\frac{w1}{m1}$$

of 100:1. The mass content $w_2$ of the second polar substance in the second coating and the mass content $m_2$ of the negative binder in the negative film layer had a ratio $$\frac{w2}{m2}$$

of 50:1.

Example 1-7

For the fabrication process of the lithium ion battery, reference was overall made to example 1-1 except that the positive active substance $LiNi_{0.6}Co_{0.2}Mn_{0.2}O_2$, the positive binder PVDF and the conductive carbon were mixed according to a mass ratio of 97:0.76:2.24, and the negative active substance (carbon-silicon mixture), the negative binder and the carbon nanotubes were mixed according to a mass ratio of 97:1.5:1.5.

The mass content $w_1$ of the first polar substance in the first coating and the mass content $m_1$ of the positive binder in the positive film layer had a ratio $$\frac{w1}{m1}$$

of 105:1. The mass content $w_2$ of the second polar substance in the second coating and the mass content $m_2$ of the negative binder in the negative film layer had a ratio $$\frac{w2}{m2}$$

of 53:1.

Example 2-1

1. Fabrication of Separator

1) A first polar substance PAM and alumina were dissolved in NMP according to a mass ratio of 96.8:3.2, the mixture was stirred to be even to obtain first coating slurry, and a surface A of a PE base film (surface of the PE base film close to a positive electrode) was coated with the first coating slurry using a gravure coating method.

2) A second polar substance PEO and alumina were dissolved in deionized water according to a mass ratio of 77.5:22.5, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

A mass content $w_1$ of the first polar substance in the first coating and a mass content $w_2$ of the second polar substance in the second coating had a ratio $$\frac{w1}{w2}$$

of 1:0.8.

2. Fabrication of Positive Electrode

A positive active substance $LiNi_{0.6}Co_{0.2}Mn_{0.2}O_2$, a positive binder PVDF and conductive carbon were mixed according to a mass ratio of 97:1:2 and dissolved in NMP, the mixture was stirred for 6 h to obtain positive slurry, aluminum foil was coated with the positive slurry, and drying and cold pressing were performed to obtain the positive electrode.

3. Fabrication of Negative Electrode

SA and SBR were mixed according to a mass ratio of 80:20 to obtain a negative binder, a negative active substance (carbon-silicon mixture (C:Si=95:5)), the negative binder and carbon nanotubes were mixed according to a mass ratio of 97:2.5:0.5 and dissolved in water, the mixture was stirred for 6 h to obtain negative slurry, copper foil was coated with the negative slurry, and drying and cold pressing were performed to obtain the negative electrode.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 2-2

This example was basically same as example 2-1 except that the first polar substance PAM and the alumina had a mass ratio of 85:15, and the second polar substance PEO and the alumina had a mass ratio of 85:15. The mass content $w_1$ of the first polar substance in the first coating and the mass content $w_2$ of the second polar substance in the second coating had a ratio $$\frac{w1}{w2}$$

of 1:1.

Example 2-3

For the fabrication process of the lithium ion battery, reference was overall made to example 2-1 except that the first polar substance PAM and the alumina had a mass ratio of 71.1:28.9, and the second polar substance PEO and the alumina had a mass ratio of 92.5:7.5. The mass content $w_1$ of the first polar substance in the first coating and the mass content $w_2$ of the second polar substance in the second coating had a ratio $$\frac{w1}{w2}$$

of 1:1.3.

Example 2-4

For the fabrication process of the lithium ion battery, reference was overall made to example 2-1 except that the first polar substance PAM and the alumina had a mass ratio of 65:35, and the second polar substance PEO and the alumina had a mass ratio of 97.5:2.5. The mass content $w_1$ of the first polar substance in the first coating and the mass content $w_2$ of the second polar substance in the second coating had a ratio $$\frac{w1}{w2}$$

of 1:1.5.

Example 3-1

1. Fabrication of Separator

1) A first polar substance (polyurea) and alumina were dissolved in NMP according to a mass ratio of 75:25, the mixture was stirred to be even to obtain first coating slurry, and a surface A of a PE base film (surface of the PE base film close to a positive electrode) was coated with the first coating slurry using a gravure coating method.

2) A second polar substance PAM and alumina were dissolved in deionized water according to a mass ratio of 75:25, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

2. Fabrication of Positive Electrode

A positive active substance $LiNi_{0.6}Co_{0.2}Mn_{0.2}O_2$, a positive binder PVDF and conductive carbon were mixed according to a mass ratio of 97:0.8:2.2 and dissolved in NMP to obtain positive slurry, the positive slurry was stirred for 6 h, aluminum foil was coated with the positive slurry, and drying and cold pressing were performed to obtain the positive electrode.

3. Fabrication of Negative Electrode

SA and SBR were mixed according to a mass ratio of 80:20 to obtain a negative binder, a negative active substance (carbon-silicon mixture (C:Si=95:5)), the negative binder and carbon nanotubes were mixed according to a mass ratio of 97:1.8:1.2 and dissolved in water, the mixture was stirred for 6 h to obtain negative slurry, copper foil was coated with the negative slurry, and drying and cold pressing were performed to obtain the negative electrode.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 3-2

For the fabrication process of the lithium ion battery, reference was overall made to example 3-1 except that the first polar substance (polyurea) had a mass proportion of 80% in the first coating, and the second polar substance PAM had a mass proportion of 80% in the second coating. The positive active substance $LiNi_{0.6}Co_{0.2}Mn_{0.2}O_2$, the positive binder PVDF and the conductive carbon had a mass ratio of 97:0.9:2.3. The negative active substance (carbon-silicon mixture), the negative binder and the carbon nanotubes had a mass ratio of 97:2:1.

Example 3-3

For the fabrication process of the lithium ion battery, reference was overall made to example 3-1 except that the first polar substance (polyurea) had a mass proportion of 85% in the first coating, and the second polar substance PAM had a mass proportion of 85% in the second coating. The positive active substance $LiNi_{0.6}Co_{0.2}Mn_{0.2}O_2$, the positive binder PVDF and the conductive carbon had a mass ratio of 97:1:2. The negative active substance (carbon-silicon mixture), the negative binder and the carbon nanotubes had a mass ratio of 97:2.6:0.4.

Example 3-4

For the fabrication process of the lithium ion battery, reference was overall made to example 3-1 except that the first polar substance (polyurea) had a mass proportion of 90% in the first coating, and the second polar substance PAM had a mass proportion of 90% in the second coating. The positive active substance $LiNi_{0.6}Co_{0.2}Mn_{0.2}O_2$, the positive binder PVDF and the conductive carbon had a mass ratio of 97:1.2:1.8. The negative active substance (carbon-silicon mixture), the negative binder and the carbon nanotubes had a mass ratio of 97:3:0.

Example 3-5

For the fabrication process of the lithium ion battery, reference was overall made to example 3-1 except that the first polar substance (polyurea) had a mass proportion of 92% in the first coating, and the second polar substance PAM had a mass proportion of 92% in the second coating. The positive active substance $LiNi_{0.6}Co_{0.2}Mn_{0.2}O_2$, the positive binder PVDF and the conductive carbon had a mass ratio of 97:1.5:0.5. The negative active substance (carbon-silicon mixture), the negative binder and the carbon nanotubes had a mass ratio of 96.8:3.2:0.

Example 4-1

1. Fabrication of Separator

1) A first polar substance PEO, a first reinforcing agent PVDF and alumina were dissolved in NMP according to a mass ratio of 80:14:6, the mixture was stirred to be even to obtain first coating slurry, and a surface A of a PE base film (surface of the PE base film close to a positive electrode) was coated with the first coating slurry using a gravure coating method.

2) A second polar substance PEI and a first reinforcing agent PVDF were dissolved in deionized water according to a mass ratio of 80:20, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

A mass content $k_1$ of the first reinforcing agent in the first coating and a mass content $k_2$ of the second reinforcing agent in the second coating had a ratio $$\frac{k1}{k2}$$

of 0.7:1.

2. Fabrication of Positive Electrode

A positive active substance $LiNi_{0.6}Co_{0.2}Mn_{0.2}O_2$, a positive binder PVDF and conductive carbon were mixed according to a mass ratio of 97:1:2 and dissolved in NMP, the mixture was stirred for 6 h to obtain positive slurry, aluminum foil was coated with the positive slurry, and drying and cold pressing were performed to obtain the positive electrode.

3. Fabrication of Negative Electrode

SA and SBR were mixed according to a mass ratio of 80:20 to obtain a negative binder, a negative active substance (carbon-silicon mixture (C:Si=95:5)), the negative binder and carbon nanotubes were mixed according to a mass ratio of 97:2.5:0.5 and dissolved in water, the mixture was stirred for 6 h to obtain negative slurry, copper foil was coated with the negative slurry, and drying and cold pressing were performed to obtain the negative electrode.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 4-2

For the fabrication process of the lithium ion battery, reference was overall made to example 4-1 except that the first polar substance PEO, the first reinforcing agent PVDF and the alumina had a mass ratio of 80:16.6:3.4. The mass content $k_1$ of the first reinforcing agent in the first coating and the mass content $k_2$ of the second reinforcing agent in the second coating had a ratio $$\frac{k1}{k2}$$

of 0.8:1.

Example 4-3

For the fabrication process of the lithium ion battery, reference was overall made to example 4-1 except that the first polar substance PEO, the first reinforcing agent PVDF and the alumina had a mass ratio of 80:18:2. The mass content $k_1$ of the first reinforcing agent in the first coating and the mass content $k_2$ of the second reinforcing agent in the second coating had a ratio $$\frac{k1}{k2}$$

of 0.9:1.

Example 4-4

For the fabrication process of the lithium ion battery, reference was overall made to example 4-1 except that the first polar substance PEO, the first reinforcing agent PVDF and the alumina had a mass ratio of 80:19:1. The mass content $k_1$ of the first reinforcing agent in the first coating and the mass content $k_2$ of the second reinforcing agent in the second coating had a ratio $$\frac{k1}{k2}$$

of 0.95:1.

Example 4-5

For the fabrication process of the lithium ion battery, reference was overall made to example 4-1 except that the first polar substance PEO and the first reinforcing agent PVDF had a mass ratio of 80:20. The mass content $k_1$ of the first reinforcing agent in the first coating and the mass content $k_2$ of the second reinforcing agent in the second coating had a ratio $$\frac{k1}{k2}$$

of 1:1.

Example 5-1

1. Fabrication of Separator

1) A first polar substance PAM, a first reinforcing agent PVDF and alumina were dissolved in NMP according to a mass ratio of 80:17.4:2.6, the mixture was stirred to be even to obtain first coating slurry, and a surface A of a PE base film (surface of the PE base film close to a positive electrode) was coated with the first coating slurry using a gravure coating method.

2) A second polar substance PEO and a first reinforcing agent PVDF were dissolved in deionized water according to a mass ratio of 83:17, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

A mass content $w_1$ of the first polar substance in the first coating and a mass content $k_1$ of the first reinforcing agent in the first coating had a mass ratio $$\frac{w1}{k1}$$

of 4.6:1; the second coating includes a second reinforcing agent, and a mass content $w_2$ of the second polar substance in the second coating and a mass content $k_2$ of the second reinforcing agent in the second coating had a mass ratio $$\frac{w2}{k2}$$

of 4.9:1.

2. Fabrication of Positive Electrode

A positive active substance $LiNi_{0.6}Co_{0.2}Mn_{0.2}O_2$, a positive binder PVDF and conductive carbon were mixed according to a mass ratio of 97:1:2 and dissolved in NMP, the mixture was stirred for 6 h to obtain positive slurry, aluminum foil was coated with the positive slurry, and drying and cold pressing were performed to obtain the positive electrode.

3. Fabrication of Negative Electrode

SA and SBR were mixed according to a mass ratio of 80:20 to obtain a negative binder, a negative active substance (carbon-silicon mixture (C:Si=95:5)), the negative binder and carbon nanotubes were mixed according to a mass ratio of 97:2.5:0.5 and dissolved in water, the mixture was stirred for 6 h to obtain negative slurry, copper foil was coated with the negative slurry, and drying and cold pressing were performed to obtain the negative electrode.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 5-2

For the fabrication process of the lithium ion battery, reference was overall made to example 5-1 except that the first polar substance PAM, the first reinforcing agent PVDF and the alumina had a mass ratio of 80:16:4. The second polar substance PEO and the second reinforcing agent PVDF had a mass ratio of 83.4:16.6.

The mass content $w_1$ of the first polar substance in the first coating and the mass content $k_1$ of the first reinforcing agent in the first coating had a mass ratio $$\frac{w1}{k1}$$

of 5:1; the mass content $w_2$ of the second polar substance in the second coating and the mass content $k_2$ of the second reinforcing agent in the second coating had a mass ratio $$\frac{w2}{k2}$$

of 5:1.

Example 5-3

For the fabrication process of the lithium ion battery, reference was overall made to example 5-1 except that the first polar substance PAM, the first reinforcing agent PVDF and the alumina had a mass ratio of 80:15:5. The second polar substance PEO, the second reinforcing agent PVDF and the alumina had a mass ratio of 84.2:15.8.

The mass content $w_1$ of the first polar substance in the first coating and the mass content $k_1$ of the first reinforcing agent in the first coating had a mass ratio $$\frac{w1}{k1}$$

of 5.3:1; the mass content $w_2$ of the second polar substance in the second coating and the mass content $k_2$ of the second reinforcing agent in the second coating had a mass ratio $$\frac{w2}{k2}$$

of 5.3:1.

Example 5-4

For the fabrication process of the lithium ion battery, reference was overall made to example 5-1 except that the first polar substance PAM, the first reinforcing agent PVDF and the alumina had a mass ratio of 80:13.3:6.7. The second polar substance PEO and the second reinforcing agent PVDF had a mass ratio of 86:14.

The mass content $w_1$ of the first polar substance in the first coating and the mass content $k_1$ of the first reinforcing agent in the first coating had a mass ratio $$\frac{w1}{k1}$$

of 6:1: the mass content $w_2$ of the second polar substance in the second coating and the mass content $k_2$ of the second reinforcing agent in the second coating had a mass ratio $$\frac{w2}{k2}$$

of 6:1.

Example 5-5

For the fabrication process of the lithium ion battery, reference was overall made to example 5-1 except that the first polar substance PAM, the first reinforcing agent PVDF and the alumina had a mass ratio of 80:10:10. The second polar substance PEO and the second reinforcing agent PVDF had a mass ratio of 89:11.

The mass content $w_1$ of the first polar substance in the first coating and the mass content $k_1$ of the first reinforcing agent in the first coating had a mass ratio $$\frac{w1}{k1}$$

of 8:1: the mass content $w_2$ of the second polar substance in the second coating and the mass content $k_2$ of the second reinforcing agent in the second coating had a mass ratio $$\frac{w2}{k2}$$

of 8:1.

Example 5-6

For the fabrication process of the lithium ion battery, reference was overall made to example 5-1 except that the first polar substance PAM, the first reinforcing agent PVDF and the alumina had a mass ratio of 80:8.9:11.1. The second polar substance PEO, the second reinforcing agent PVDF and the alumina had a mass ratio of 90:10.

The mass content $w_1$ of the first polar substance in the first coating and the mass content $k_1$ of the first reinforcing agent in the first coating had a mass ratio $$\frac{w1}{k1}$$

of 9:1: the second coating includes the second reinforcing agent, and the mass content $w_2$ of the second polar substance in the second coating and the mass content $k_2$ of the second reinforcing agent in the second coating had a mass ratio $$\frac{w2}{k2}$$

of 9:1.

Example 5-7

For the fabrication process of the lithium ion battery, reference was overall made to example 5-1 except that the first polar substance PAM, the first reinforcing agent PVDF and the alumina had a mass ratio of 80:8.6:11.4. The second polar substance PEO and the second reinforcing agent PVDF had a mass ratio of 90.3:9.7.

The mass content $w_1$ of the first polar substance in the first coating and the mass content $k_1$ of the first reinforcing agent in the first coating had a mass ratio $$\frac{w1}{k1}$$

of 9.3:1: the second coating includes the second reinforcing agent, and the mass content $w_2$ of the second polar substance in the second coating and the mass content $k_2$ of the second reinforcing agent in the second coating had a mass ratio $$\frac{w2}{k2}$$

of 9.3:1.

Example 6-1

1. Fabrication of Separator

1) A first polar substance PEO and a first reinforcing agent PVDF were dissolved in NMP according to a mass ratio of 80:20, the mixture was stirred to be even to obtain first coating slurry, and a surface A of a PE base film (surface of the PE base film close to a positive electrode) was coated with the first coating slurry using a gravure coating method.

2) A second polar substance PEO and a first reinforcing agent PVDF were dissolved in deionized water according to a mass ratio of 80:20, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

2. Fabrication of Positive Electrode

A positive active substance $LiNi_{0.6}Co_{0.2}Mn_{0.2}O_2$, a positive binder PVDF and conductive carbon were mixed according to a mass ratio of 97:1:2 and dissolved in NMP, the mixture was stirred for 6 h to obtain positive slurry, aluminum foil was coated with the positive slurry, and drying and cold pressing were performed to obtain the positive electrode.

3. Fabrication of Negative Electrode

SA and SBR were mixed according to a mass ratio of 80:20 to obtain a negative binder, a negative active substance (carbon-silicon mixture (C:Si=95:5, Si had a particle size of 0.05 μm)), the negative binder and carbon nanotubes were mixed according to a mass ratio of 95.9:2.5:1.6 and dissolved in water, the mixture was stirred for 6 h to obtain negative slurry, copper foil was coated with the negative slurry, and drying and cold pressing were performed to obtain the negative electrode.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 6-2

For the fabrication process of the lithium ion battery, reference was overall made to example 6-1 except that the negative active substance (carbon-silicon mixture (C:Si=95:5, Si had a particle size of 0.1 μm)), the negative binder and the carbon nanotubes had a mass ratio of 96.7:2.5:0.8.

Example 6-3

This example was basically same as example 6-1 except that the negative active substance (carbon-silicon mixture (Si had a particle size of 0.3 μm)), the negative binder and the carbon nanotubes had a mass ratio of 97:2.5:0.5.

Example 6-4

For the fabrication process of the lithium ion battery, reference was overall made to example 6-1 except that the negative active substance (carbon-silicon mixture (C:Si=95:5, Si had a particle size of 0.5 μm)), the negative binder and the carbon nanotubes had a mass ratio of 96.8:2.5:0.7.

Example 6-5

For the fabrication process of the lithium ion battery, reference was overall made to example 6-1 except that the negative active substance (carbon-silicon mixture (Si had a particle size of 0.6 μm)), the negative binder and the carbon nanotubes had a mass ratio of 96:2.5:1.5.

Example 7-1

1. Fabrication of Separator

1) A first polar substance PEO and a first reinforcing agent PVDF were dissolved in NMP according to a mass ratio of 80:20, the mixture was stirred to be even to obtain first coating slurry, and a surface A of a PE base film (surface of the PE base film close to a positive electrode) was coated with the first coating slurry using a gravure coating method.

2) A second polar substance PEO and a first reinforcing agent PVDF were dissolved in deionized water according to a mass ratio of 80:20, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

2. Fabrication of Positive Electrode

A positive active substance $LiNi_{0.4}Co_{0.4}Mn_{0.2}O_2$, a positive binder PVDF and conductive carbon were mixed according to a mass ratio of 97:1:2 and dissolved in NMP, the mixture was stirred for 6 h to obtain positive slurry, aluminum foil was coated with the positive slurry, and drying and cold pressing were performed to obtain the positive electrode.

3. Fabrication of Negative Electrode

SA and SBR were mixed according to a mass ratio of 80:20 to obtain a negative binder, a negative active substance (carbon-silicon mixture (C:Si=95:5, Si had a particle size of 0.3 μm)), the negative binder and carbon nanotubes were mixed according to a mass ratio of 97:2.5:0.5 and dissolved in water, the mixture was stirred for 6 h to obtain negative slurry, copper foil was coated with the negative slurry, and drying and cold pressing were performed to obtain the negative electrode.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 7-2

For the fabrication process of the lithium ion battery, reference was overall made to example 7-1 except that the positive active substance was $LiNi_{0.5}Co_{0.2}Mn_{0.3}O_2$.

Example 7-3

For the fabrication process of the lithium ion battery, reference was overall made to example 7-1 except that the positive active substance was $LiNi_{0.6}Co_{0.2}Mn_{0.2}O_2$.

Example 7-4

For the fabrication process of the lithium ion battery, reference was overall made to example 7-1 except that the positive active substance was $LiNi_{0.6}Co_{0.1}Mn_{0.1}O_2$.

Example 7-5

For the fabrication process of the lithium ion battery, reference was overall made to example 7-1 except that the positive active substance was $LiNi_{0.9}Co_{0.05}Mn_{0.05}O_2$.

Example 8-1

1. Fabrication of Separator

1) PEO and PAM were mixed according to a mass ratio of 1.8:1 to obtain a first polar substance, the first polar substance and a first reinforcing agent PVDF were dissolved in NMP according to a mass ratio of 80:20, the mixture was stirred to be even to obtain first coating slurry, and a surface A of a PE base film (surface of the PE base film close to a positive electrode) was coated with the first coating slurry using a gravure coating method.

2) PEI and PEO were mixed according to a mass ratio of 1.8:1 to obtain a second polar substance, the second polar substance and a first reinforcing agent PVDF were dissolved in deionized water according to a mass ratio of 80:20, the mixture was stirred to be even to obtain second coating slurry, and a surface B of the PE base film (surface of the PE base film close to a negative electrode) was coated with the second coating slurry using a gravure coating method.

3) The PE base film coated with the first coating slurry in step 1) and the second coating slurry in step 2) was dried at 60° C. for 1 h to form a first coating and a second coating on the two surfaces of the PE base film, and the separator was obtained.

2. Fabrication of Positive Electrode

A positive active substance $LiNi_{0.4}Co_{0.4}Mn_{0.4}O_2$, a positive binder PVDF and conductive carbon were mixed according to a mass ratio of 97:1:2 and dissolved in NMP, the mixture was stirred for 6 h to obtain positive slurry, aluminum foil was coated with the positive slurry, and drying and cold pressing were performed to obtain the positive electrode.

3. Fabrication of Negative Electrode

SA and SBR were mixed according to a mass ratio of 80:20 to obtain a negative binder, a negative active substance (carbon-silicon mixture (C:Si=95:5, Si had a particle size of 0.3 μm)), the negative binder and carbon nanotubes were mixed according to a mass ratio of 97:2.5:0.5 and dissolved in water, the mixture was stirred for 6 h to obtain negative slurry, copper foil was coated with the negative slurry, and drying and cold pressing were performed to obtain the negative electrode.

4. Fabrication of Battery

The positive electrode, the separator and the negative electrode were stacked in sequence, the first coating of the separator being in contact with the positive electrode, and the second coating of the separator being in contact with the negative electrode; and then, the positive electrode, the separator and the negative electrode were wound to obtain a bare cell. The bare cell was placed into an aluminum shell, a top cover was welded, and liquid injection, standing at a high temperature, formation, aging and other processes were performed to obtain the lithium ion battery.

Example 8-2

For the fabrication process of the lithium ion battery, reference was overall made to example 8-1 except that the PEO and the PAM had a mass ratio of 2:1 in the first polar substance, and the PEI and the PEO had a mass ratio of 2:1 in the second polar substance.

Example 8-3

For the fabrication process of the lithium ion battery, reference was overall made to example 8-1 except that the PEO and the PAM had a mass ratio of 3:1 in the first polar substance, and the PEI and the PEO had a mass ratio of 3:1 in the second polar substance.

Example 8-4

For the fabrication process of the lithium ion battery, reference was overall made to example 8-1 except that the PEO and the PAM had a mass ratio of 4.5:1 in the first polar substance, and the PEI and the PEO had a mass ratio of 4.5:1 in the second polar substance.

Example 8-5

For the fabrication process of the lithium ion battery, reference was overall made to example 8-1 except that the PEO and the PAM had a mass ratio of 5:1 in the first polar substance, and the PEI and the PEO had a mass ratio of 5:1 in the second polar substance.

Example 8-6

For the fabrication process of the lithium ion battery, reference was overall made to example 8-1 except that the PEO and the PAM had a mass ratio of 6:1 in the first polar substance, and the PEI and the PEO had a mass ratio of 6:1 in the second polar substance.

Example 8-7

For the fabrication process of the lithium ion battery, reference was overall made to example 8-1 except that the PEO and the PAM had a mass ratio of 6.3:1 in the first polar substance, and the PEI and the PEO had a mass ratio of 6.3:1 in the second polar substance.

Comparative Example 1

For the fabrication process of the lithium ion battery, reference was overall made to Examples 1-2 except that the first polar substance PEO and the second polar substance PEI were not contained.

Comparative Example 2

For the fabrication process of the lithium ion battery, reference was overall made to Examples 1-2 except that the first polar substance PEO was not included, and the second polar substance PEI had a proportion of 100% in the second coating.

Comparative Example 3

For the fabrication process of the lithium ion battery, reference was overall made to Examples 1-2 except that the second polar substance PEI was not included, and the first polar substance PEO had a proportion of 100% in the first coating.

2. Performance Test

1. Method for Testing Peeling Forces Between Surfaces of Positive and Negative Electrodes and Coatings of Separator The separators of an example and a comparative example were cut into test samples having a length of 100 mm and a width of 10 mm. A stainless steel plate with a width of 25 mm was taken, double-sided adhesive tape (with a width of 11 mm) was pasted, the test sample was pasted to the double-sided adhesive tape on the stainless steel plate, and a press roller of 2,000 g was used for rolling back and forth three times (300 mm/min) on a surface of the test sample. The test sample was bent by 180 degrees, an organic-inorganic mixed layer and the base film of the test sample were manually peeled by 25 mm, the test sample was fixed on a testing machine (such as INSTRON 336) to keep the peeling surface and a force line of the testing machine consistent, the testing machine performed continuous peeling at 30 mm/min to obtain a peeling force curve, an average value of a stable section was taken as a peeling force F0, and a binding force F between the organic-inorganic mixed layer and a current collector in the test sample was calculated by the following formula. F=F0/width of test sample (unit of F: N/m).

2. Infrared Spectrum Test

The test was performed according to the standard GB/T6040-2002 "Infrared Spectrum Analysis Method" using an IS10 Fourier transform infrared spectrometer of Thermo Nicolet Corporation. The positive slurry obtained in the example and the comparative example was subjected to suction filtration to obtain positive powder; the PE base film was coated with the first coating slurry obtained in the example and the comparative example, and the PE base film was removed after suction filtration to obtain first coating powder. The positive powder and the first coating powder were mixed and further dried to obtain mixed powder; an infrared test was performed on the mixed powder. The infrared test method between the second coating and the negative electrode was same as the above method.

3. Normal temperature cycle performance: the batteries of all the examples and comparative examples were subjected to constant-current and constant-voltage charging at a charging current of 1 C in a 25° C. environment until an upper limit voltage was 4.35V. Then, constant-current discharge was performed at a discharge current of 1 C until a final voltage was 2.8V, and a first discharge capacity value C0 at this point was recorded. The batteries of all the examples and comparative examples were then charged at a voltage of 3.3V to 4.3V at 0.33 C0 and discharged at 1 C0, this process was repeated continuously, and a discharge capacity Cn after 1,000 cycles was recorded. Capacity conservation rate at 1,000th cycle=(discharge capacity at 1,000th cycle/discharge capacity at first cycle)×100%.

4. High-rate discharge capacity: the batteries of all the examples and comparative examples were subjected to constant-current and constant-voltage charging at a charging current of ⅓C in a 25° C. environment until an upper limit voltage was 4.35V. Then, constant-current discharge was performed at discharge currents of ⅓C, 3 C and 5 C until the final voltage was 2.8V, and a discharge capacity value at this point was recorded.

5. Method for Testing Cycle Expansion Rate of Winding Assembly

A thickness of the bare cell after hot pressing was measured using a vernier caliper, and after 1,000 cycles, the cell was disassembled to measure the thickness of the bare cell, expansion rate=(diameter of bare cell after cycle-diameter of bare cell before cycle)/thickness of bare cell before cycle. Test results of related parameters and performances of the batteries of the above Examples 1-1 to 1-7 are shown in Table 1 below.

TABLE 1

Test results of parameters and performances of Examples 1-1 to 1-7

Separator, positive electrode and negative electrode

| | First coating and positive electrode | | | | | | Second coating and negative electrode | | | | | | |
|---|---|---|---|---|---|---|---|---|---|---|---|---|---|
| | First polar sub-stance | $w_1$ | Positive binder | $m_1$ | $\frac{w1}{m1}$ | Peeling force (N) | Second polar sub-stance | $w_2$ | Negative binder | $m_2$ | $\frac{w2}{m2}$ | Peeling force (N) | $\frac{w1}{w2}$ |
| S1-1 | PEO | 80% | PVDF | 1.07% | 75:1 | 0.075 | PEI | 80% | SA + SBR | 2.66% | 30:1 | 0.085 | 1:0.94 |
| S1-2 | PEO | 80% | PVDF | 1% | 80:1 | 0.085 | PEI | 80% | SA + SBR | 2.5% | 32:1 | 0.092 | 1:1 |
| S1-3 | PEO | 80% | PVDF | 0.91% | 87:1 | 0.090 | PEI | 80% | SA + SBR | 2.2% | 36:1 | 0.1 | 1:1.06 |
| S1-4 | PEO | 80% | PVDF | 0.86% | 93:1 | 0.095 | PEI | 80% | SA + SBR | 2% | 40:1 | 0.111 | 1:1.09 |
| S1-5 | PEO | 80% | PVDF | 0.82% | 97:1 | 0.085 | PEI | 80% | SA + SBR | 1.77% | 45:1 | 0.098 | 1:1.15 |
| S1-6 | PEO | 80% | PVDF | 0.8% | 100:1 | 0.083 | PEI | 80% | SA + SBR | 1.6% | 50:1 | 0.09 | 1:1.21 |
| S1-7 | PEO | 80% | PVDF | 0.76 | 105:1 | 0.08 | PEI | 80% | SA + SBR | 1.5% | 53:1 | 0.083 | 1:1.25 |

| | Battery performance | | |
|---|---|---|---|
| | Cycle expansion rate | Capacity conservation rate after 1,000 cycles | 5C discharge capacity (Ah) |
| S1-1 | 1.7% | 81.2% | 153.1 |
| S1-2 | 1.5% | 84.6% | 159.4 |
| S1-3 | 1.2% | 87.0% | 165.2 |
| S1-4 | 1.1% | 88.1% | 171.1 |
| S1-5 | 1.4% | 86.2% | 163.5 |
| S1-6 | 1.5% | 83.7% | 157.3 |
| S1-7 | 1.6% | 82.1% | 155.4 |

Test results of related parameters and performances of the batteries of the above Examples 2-1 to 2-4 are shown in Table 2 below.

TABLE 2

Test results of parameters and performances of Examples 2-1 to 2-4

Separator, positive electrode and negative electrode

| | First coating and positive electrode | | | | | | Second coating and positive electrode | | | | | | |
|---|---|---|---|---|---|---|---|---|---|---|---|---|---|
| | First polar sub-stance | $w_1$ | Positive binder | $m_1$ | $\frac{w1}{m1}$ | Peeling force (N) | Second polar sub-stance | $w_2$ | Negative binder | $m_2$ | $\frac{w2}{m2}$ | Peeling force (N) | $\frac{w1}{w2}$ |
| S2-1 | PAM | 96.8% | PVDF | 1% | 96.8:1 | 0.076 | PEO | 77.5% | SA + SBR | 2.5% | 31:1 | 0.075 | 1:0.8 |
| S2-2 | PAM | 85% | PVDF | 1% | 85:1 | 0.086 | PEO | 85% | SA + SBR | 2.5% | 34:1 | 0.098 | 1:1 |
| S2-3 | PAM | 71.1% | PVDF | 1% | 71.1:1 | 0.079 | PEO | 92.5% | SA + SBR | 2.5% | 37:1 | 0.081 | 1:1.3 |
| S2-4 | PAM | 65% | PVDF | 1% | 65:1 | 0.077 | PEO | 97.5% | SA + SBR | 2.5% | 39:1 | 0.076 | 1:1.5 |

| | Battery performance | | |
|---|---|---|---|
| | Cycle expansion rate | Capacity conservation rate after 1,000 cycles | 5C discharge capacity (Ah) |
| S2-1 | 1.6% | 85.6% | 158.2 |
| S2-2 | 1.2% | 87.2% | 167.2 |
| S2-3 | 1.3% | 86.0% | 163.1 |
| S2-4 | 1.5% | 85.8% | 160.5 |

Test results of related parameters and performances of the batteries of the above Examples 3-1 to 3-5 are shown in Table 3 below.

TABLE 3

Test results of parameters and performances of Examples 3-1 to 3-5

Separator, positive electrode and negative electrode

| | First coating and positive electrode | | | | | | Second coating and negative electrode | | | | | |
|---|---|---|---|---|---|---|---|---|---|---|---|---|
| | First polar sub-stance | $w_1$ | Positive binder | $m_1$ | $\frac{w1}{m1}$ | Peeling force (N) | Second polar sub-stance | $w_2$ | Negative binder | $m_2$ | $\frac{w2}{m2}$ | Peeling force (N) | $\frac{w1}{w2}$ |
| S3-1 | Polyurea | 75% | PVDF | 0.8% | 93.7:1 | 0.075 | PAM | 75% | SA + SBR | 1.8% | 41.6:1 | 0.078 | 1:1 |
| S3-2 | Polyurea | 80% | PVDF | 0.9% | 88.8:1 | 0.078 | PAM | 80% | SA + SBR | 2% | 40:1 | 0.079 | 1:1 |
| S3-3 | Polyurea | 85% | PVDF | 1% | 85:1 | 0.080 | PAM | 85% | SA + SBR | 2.6% | 32.6:1 | 0.083 | 1:1 |
| S3-4 | Polyurea | 90% | PVDF | 1.2% | 75:1 | 0.077 | PAM | 90% | SA + SBR | 3% | 30:1 | 0.080 | 1:1 |
| S3-5 | Polyurea | 92% | PVDF | 1.5% | 61.3:1 | 0.076 | PAM | 92% | SA + SBR | 3.2% | 28.8:1 | 0.077 | 1:1 |

| | Battery performance | | |
|---|---|---|---|
| | Cycle expansion rate | Capacity conservation rate after 1,000 cycles | 5C discharge capacity (Ah) |
| S3-1 | 1.8% | 78.2% | 148.3 |
| S3-2 | 1.5% | 82.0% | 159.5 |
| S3-3 | 1.4% | 84.1% | 164.2 |
| S3-4 | 1.6% | 80.8% | 155.3 |
| S3-5 | 1.7% | 79.4% | 150.3 |

Test results of related parameters and performances of the batteries of the above Examples 4-1 to 4-5 are shown in Table 4 below.

TABLE 4

Test results of parameters and performances of Examples 4-1 to 4-5

Separator, positive electrode and negative electrode

| | First coating and positive electrode | | | | | | | | | Second coating and negative electrode | | | | | |
|---|---|---|---|---|---|---|---|---|---|---|---|---|---|---|---|
| | First polar sub-stance | $w_1$ | Positive binder | $m_1$ | $\frac{w1}{m1}$ | First reinforcing agent | $k_1$ | $\frac{w1}{k1}$ | Peeling force (N) | Second polar sub-stance | $w_2$ | Negative binder | $m_2$ | $\frac{w2}{m2}$ | Second reinforcing agent |
| S4-1 | PEO | 80% | PVDF | 1% | 80:1 | PVDF | 14% | 5.7:1 | 0.091 | PEI | 80% | SA + SBR | 2.5% | 32:1 | SA |
| S4-2 | PEO | 80% | PVDF | 1% | 80:1 | PVDF | 16.6% | 4.8:1 | 0.096 | PEI | 80% | SA + SBR | 2.5% | 32:1 | SA |
| S4-3 | PEO | 80% | PVDF | 1% | 80:1 | PVDF | 18% | 4.4:1 | 0.103 | PEI | 80% | SA + SBR | 2.5% | 32:1 | SA |
| S4-4 | PEO | 80% | PVDF | 1% | 80:1 | PVDF | 19% | 4.2:1 | 0.094 | PEI | 80% | SA + SBR | 2.5% | 32:1 | SA |
| S4-5 | PEO | 80% | PVDF | 1% | 80:1 | PVDF | 20% | 4:1 | 0.090 | PEI | 80% | SA + SBR | 2.5% | 32:1 | SA |

| | Separator, positive electrode and negative electrode Second coating and negative electrode | | | | | Battery performance | | |
|---|---|---|---|---|---|---|---|---|
| | $k_2$ | $\frac{w2}{k2}$ | Peeling force (N) | $\frac{k1}{k2}$ | $\frac{w1}{w2}$ | Cycle expansion rate | Capacity conservation rate after 1,000 cycles | 5C discharge capacity (Ah) |
| S4-1 | 20% | 4 | 0.116 | 0.7:1 | 1 | 0.7% | 90.5% | 160.2 |
| S4-2 | 20% | 4 | 0.116 | 0.8:1 | 1 | 0.6% | 91.3% | 165.2 |
| S4-3 | 20% | 4 | 0.116 | 0.9:1 | 1 | 0.5% | 92.1% | 169.3 |
| S4-4 | 20% | 4 | 0.116 | 0.95:1 | 1 | 0.6% | 91.5% | 164.7 |
| S4-5 | 20% | 4 | 0.116 | 1:1 | 1 | 0.7% | 90.7% | 160.8 |

Test results of related parameters and performances of the batteries of the above Examples 5-1 to 5-7 are shown in Table 5 below.

TABLE 5

Test results of parameters and performances of Examples 5-1 to 5-7

Separator, positive electrode and negative electrode

First coating and positive electrode

| | First polar sub-stance | $w_1$ | Positive binder | $m_1$ | $\dfrac{w1}{m1}$ | First rein-forcing agent | $k_1$ | $\dfrac{w1}{k1}$ | Peeling force (N) |
|---|---|---|---|---|---|---|---|---|---|
| S5-1 | PAM | 80% | PVDF | 1% | 80:1 | PVDF | 17.4% | 4.6:1 | 0.105 |
| S5-2 | PAM | 80% | PVDF | 1% | 80:1 | PVDF | 16% | 5:1 | 0.107 |
| S5-3 | PAM | 80% | PVDF | 1% | 80:1 | PVDF | 15% | 5.3:1 | 0.112 |
| S5-4 | PAM | 80% | PVDF | 1% | 80:1 | PVDF | 13.3% | 6:1 | 0.115 |
| S5-5 | PAM | 80% | PVDF | 1% | 80:1 | PVDF | 10% | 8:1 | 0.114 |
| S5-6 | PAM | 80% | PVDF | 1% | 80:1 | PVDF | 8.9% | 9:1 | 0.110 |
| S5-7 | PAM | 80% | PVDF | 1% | 80:1 | PVDF | 8.6% | 9.3:1 | 0.107 |

Second coating and negative electrode

| | Second polar sub-stance | $w_2$ | Negative binder | $m_2$ | $\dfrac{w2}{m2}$ |
|---|---|---|---|---|---|
| S5-1 | PEO | 83% | SA + SBR | 2.5% | 33.2:1 |
| S5-2 | PEO | 83.4% | SA + SBR | 2.5% | 33.3:1 |
| S5-3 | PEO | 84.2% | SA + SBR | 2.5% | 33.6:1 |
| S5-4 | PEO | 86% | SA + SBR | 2.5% | 34.4:1 |
| S5-5 | PEO | 89% | SA + SBR | 2.5% | 35.6:1 |
| S5-6 | PEO | 90% | SA + SBR | 2.5% | 36:1 |
| S5-7 | PEO | 90.3% | SA + SBR | 2.5% | 36.1:1 |

Separator, positive electrode and negative electrode — Second coating and negative electrode

| | Second rein-forcing agent | $k_2$ | $\dfrac{w2}{k2}$ | Peeling force (N) | $\dfrac{k1}{k2}$ | $\dfrac{w1}{w2}$ |
|---|---|---|---|---|---|---|
| S5-1 | SA | 17% | 4.9:1 | 0.097 | 1.02:1 | 1:1.03 |
| S5-2 | SA | 16.6% | 5:1 | 0.108 | 1:1.04 | 1:1.04 |
| S5-3 | SA | 15.8% | 5.3:1 | 0.115 | 1:1.05 | 1:1.05 |
| S5-4 | SA | 14% | 6:1 | 0.129 | 1:1.05 | 1:1.07 |
| S5-5 | SA | 11% | 8:1 | 0.111 | 1:1.1 | 1:1.1 |
| S5-6 | SA | 10% | 9:1 | 0.109 | 1:1.12 | 1:1.12 |
| S5-7 | SA | 9.7% | 9.3:1 | 0.095 | 1:1.13 | 1:1.13 |

Battery performance

| | Cycle expans-ion rate | Capacity conserva-tion rate after 1,000 cycles | 5C discharge capacity (Ah) |
|---|---|---|---|
| S5-1 | 0.8% | 87.9% | 162.3 |
| S5-2 | 0.8% | 88.5% | 164.1 |
| S5-3 | 0.7% | 89.4% | 165.5 |
| S5-4 | 0.6% | 90.2% | 168.2 |
| S5-5 | 0.7% | 89.2% | 167.6 |
| S5-6 | 0.8% | 88.6% | 165.1 |
| S5-7 | 0.8% | 87.8% | 162.0 |

Test results of related parameters and performances of the batteries of the above Examples 6-1 to 6-5 are shown in Table 6 below.

Test results of related parameters and performances of the batteries of the above Examples 7-1 to 7-5 are shown in Table 7 below.

TABLE 6

Test results of parameters and performances of Examples 6-1 to 6-5

Separator, positive electrode and negative electrode

First coating and positive electrode

| | First polar sub-stance | $w_1$ | Positive binder | $m_1$ | $\dfrac{w1}{m1}$ | First rein-forcing agent | $k_1$ | $\dfrac{w1}{k1}$ | Peeling force (N) |
|---|---|---|---|---|---|---|---|---|---|
| S6-1 | PEO | 80% | PVDF | 1% | 80:1 | PVDF | 20% | 4:1 | 0.118 |
| S6-2 | PEO | 80% | PVDF | 1% | 80:1 | PVDF | 20% | 4:1 | 0.117 |
| S6-3 | PEO | 80% | PVDF | 1% | 80:1 | PVDF | 20% | 4:1 | 0.120 |
| S6-4 | PEO | 80% | PVDF | 1% | 80:1 | PVDF | 20% | 4:1 | 0.115 |
| S6-5 | PEO | 80% | PVDF | 1% | 80:1 | PVDF | 20% | 4:1 | 0.118 |

Second coating and negative electrode

| | Second polar sub-stance | $w_2$ | Negative binder |
|---|---|---|---|
| S6-1 | PEI | 80% | SA + SBR |
| S6-2 | PEI | 80% | SA + SBR |
| S6-3 | PEI | 80% | SA + SBR |
| S6-4 | PEI | 80% | SA + SBR |
| S6-5 | PEI | 80% | SA + SBR |

Separator, positive electrode and negative electrode — Second coating and negative electrode

| | $m_2$ | $\dfrac{w2}{m2}$ | Second reinforc-ing agent | $k_2$ | $\dfrac{w2}{k2}$ |
|---|---|---|---|---|---|
| S6-1 | 2.5% | 32:1 | SA | 20% | 4:1 |
| S6-2 | 2.5% | 32:1 | SA | 20% | 4:1 |
| S6-3 | 2.5% | 32:1 | SA | 20% | 4:1 |
| S6-4 | 2.5% | 32:1 | SA | 20% | 4:1 |
| S6-5 | 2.5% | 32:1 | SA | 20% | 4:1 |

Silicon-carbon mixture

| | Particle size of silicon (μm) | Content of silicon-carbon mixture in negative film layer | Peeling force (N) |
|---|---|---|---|
| S6-1 | 0.05 | 95.9% | 0.140 |
| S6-2 | 0.1 | 96.7% | 0.138 |
| S6-3 | 0.3 | 97% | 0.148 |
| S6-4 | 0.5 | 96.8% | 0.136 |
| S6-5 | 0.6 | 96% | 0.139 |

Battery performance

| | Cycle expans-ion rate | Capacity conserva-tion rate after 1,000 cycles | 5C discharge capacity (Ah) |
|---|---|---|---|
| S6-1 | 0.3% | 92.1% | 167.6 |
| S6-2 | 0.4% | 92.47% | 168.2 |
| S6-3 | 0.5% | 94.8% | 170.3 |
| S6-4 | 0.4% | 92.5% | 167.5 |
| S6-5 | 0.3% | 92.2% | 166.9 |

TABLE 7

Test results of parameters and performances of Examples 7-1 to 7-5

Separator, positive electrode and negative electrode

| | First coating and positive electrode | | | | | | | | Second coating and negative electrode | | |
|---|---|---|---|---|---|---|---|---|---|---|---|
| | First polar sub-stance | $w_1$ | Positive binder | $m_1$ | $\dfrac{w1}{m1}$ | First rein-forcing agent | k1 | $\dfrac{w1}{k1}$ | Peeling force (N) | Second polar sub-stance | $w_2$ | Negative binder |
| S7-1 | PEO | 80% | PVDF | 1% | 80:1 | PVDF | 20% | 4:1 | 0.103 | PEI | 80% | SA + SBR |
| S7-2 | PEO | 80% | PVDF | 1% | 80:1 | PVDF | 20% | 4:1 | 0.115 | PEI | 80% | SA + SBR |
| S7-3 | PEO | 80% | PVDF | 1% | 80:1 | PVDF | 20% | 4:1 | 0.120 | PEI | 80% | SA + SBR |
| S7-4 | PEO | 80% | PVDF | 1% | 80:1 | PVDF | 20% | 4:1 | 0.112 | PEI | 80% | SA + SBR |
| S7-5 | PEO | 80% | PVDF | 1% | 80:1 | PVDF | 20% | 4:1 | 0.102 | PEI | 80% | SA + SBR |

| | Separator, positive electrode and negative electrode Second coating and negative electrode | | | | | Content x of nickel in ternary material | | Silicon-carbon mixture | | Battery performance | | |
|---|---|---|---|---|---|---|---|---|---|---|---|---|
| | $m_2$ | $\dfrac{w2}{m2}$ | Second rein-forcing agent | $k_2$ | $\dfrac{w2}{k2}$ | Content x of nickel | Peeling force (N) | Particle Size of silicon (μm) | Content of silicon-carbon mixture in negative film layer | Cycle expans-ion rate | Capacity conserva-tion rate after 1,000 cycles | 5C discharge capacity (Ah) |
| S7-1 | 2.5% | 32:1 | SA | 20% | 4:1 | 0.4 | 0.140 | 0.3 | 97% | 0.88% | 91.5% | 160.8 |
| S7-2 | 2.5% | 32:1 | SA | 20% | 4:1 | 0.5 | 0.142 | 0.3 | 97% | 0.6% | 93.4% | 166.5 |
| S7-3 | 2.5% | 32:1 | SA | 20% | 4:1 | 0.6 | 0.148 | 0.3 | 97% | 0.5% | 94.8% | 170.3 |
| S7-4 | 2.5% | 32:1 | SA | 20% | 4:1 | 0.8 | 0.135 | 0.3 | 97% | 0.7% | 92.1% | 186.3 |
| S7-5 | 2.5% | 32:1 | SA | 20% | 4:1 | 0.9 | 0.135 | 0.3 | 97% | 0.85% | 89.5% | 190.1 |

Test results of related parameters and performances of the batteries of the above Examples 8-1 to 8-7 are shown in Table 8 below.

TABLE 8

Test results of parameters and performances of Examples 8-1 to 8-7

Separator, positive electrode and negative electrode

| | First coating and positive electrode | | | | | | | | | Second coating and negative electrode | | |
|---|---|---|---|---|---|---|---|---|---|---|---|---|
| | First polar sub-stance | C1 | $w_1$ | Positive binder | $m_1$ | $\dfrac{w1}{m1}$ | First reinforc-ing agent | $k_1$ | $\dfrac{w1}{k1}$ | Peeling force (N) | Second polar sib-substance | C2 | $w_2$ |
| S8-1 | PEO + PA | 1.8:1 | 80% | PVDF | 1% | 80:1 | PVDF | 20% | 4:1 | 0.115 | PEI + PEO | 1.8:1 | 80% |
| S8-2 | PEO + PA | 2:1 | 80% | PVDF | 1% | 80:1 | PVDF | 20% | 4:1 | 0.117 | PEI + PEO | 2:1 | 80% |
| S8-3 | PEO + PA | 3:1 | 80% | PVDF | 1% | 80:1 | PVDF | 20% | 4:1 | 0.121 | PEI + PEO | 3:1 | 80% |
| S8-4 | PEO + PA | 4.5:1 | 80% | PVDF | 1% | 80:1 | PVDF | 20% | 4:1 | 0.125 | PEI + PEO | 4.5:1 | 80% |
| S8-5 | PEO + PA | 5:1 | 80% | PVDF | 1% | 80:1 | PVDF | 20% | 4:1 | 0.122 | PEI + PEO | 5:1 | 80% |
| S8-6 | PEO + PA | 6:1 | 80% | PVDF | 1% | 80:1 | PVDF | 20% | 4:1 | 0.110 | PEI + PEO | 6:1 | 80% |
| S8-7 | PEO + PA | 6.3:1 | 80% | PVDF | 1% | 80:1 | PVDF | 2 | 4:1 | 0.116 | PEI + PEO | 6.3:1 | 80% |

| | Separator, positive electrode and negative electrode Second coating and negative electrode | | | | | | | | | Batterly performance | | |
|---|---|---|---|---|---|---|---|---|---|---|---|---|
| | Negative binder | $m_2$ | $\dfrac{w2}{m2}$ | Second rein-forcing agent | $k_2$ | $\dfrac{w2}{k2}$ | Peeling force (N) | $\dfrac{k1}{k2}$ | $\dfrac{w1}{w2}$ | Cycle expansion rate | Capacity conservat-ion rate after 1,000 cycles | 5C discharge capacity (Ah) |
| S8-1 | SA + SBR | 2.5% | 32:1 | SA | 20% | 4:1 | 0.140 | 1 | 1 | 0.5% | 90.8% | 167.3 |
| S8-2 | SA + SBR | 2.5% | 32:1 | SA | 20% | 4:1 | 0.143 | 1 | 1 | 0.5% | 91.1% | 168.2 |
| S8-3 | SA + SBR | 2.5% | 32:1 | SA | 20% | 4:1 | 0.147 | 1 | 1 | 0.4% | 92.2% | 170.4 |
| S8-4 | SA + SBR | 2.5% | 32:1 | SA | 20% | 4:1 | 0.150 | 1 | 1 | 0.3% | 93.1% | 172.2 |
| S8-5 | SA + SBR | 2.5% | 32:1 | SA | 20% | 4:1 | 0.148 | 1 | 1 | 0.4% | 92.4% | 169.0 |

TABLE 8-continued

Test results of parameters and performances of Examples 8-1 to 8-7

| S8-6 | SA + SBR | 2.5% | 32:1 | SA | 20% | 4:1 | 0.145 | 1 | 1 | 0.5% | 91.6% | 167.8 |
| S8-7 | SA + SBR | 2.5% | 32:1 | SA | 20% | 4:1 | 0.141 | 1 | 1 | 0.5% | 90.9% | 164.1 |

Test results of related parameters and performances of the batteries of the above Comparative Examples 1 to 3 are shown in Table 9 below.

battery performances, such as the cycle expansion rate, the capacity conservation rate after 1,000 cycles and the 5 C discharge capacity, are obtained by adjusting

TABLE 9

Test results of parameters and performances of Comparative Examples 1 to 3

Separator, positive electrode and negative electrode

| | First coating and positive electrode | | | | | | Second coating and negative electrode | | | | | | | |
|---|---|---|---|---|---|---|---|---|---|---|---|---|---|---|
| | First polar substance | $w_1$ | Positive binder | $m_1$ | $\frac{w1}{m1}$ | Peeling force (N) | Second polar substance | $w_2$ | Negative binder | $m_2$ | $\frac{w2}{m2}$ | Peeling force (N) | $\frac{k1}{k2}$ | $\frac{w1}{w2}$ |
| Comparative Example 1 | / | / | PVDF | 1% | / | 0.1 | / | / | SA + SBR | 2.5% | / | 0.1 | / | / |
| Comparative example 2 | / | / | PVDF | 1% | / | 0.1 | PEI | 100% | SA + SBR | 2.5% | / | 0.22 | / | / |
| Comparative example 3 | PEO | 100% | PVDF | 1% | / | 0.2 | / | / | SA + SBR | 2.5% | / | 0.1 | / | / |

| | Battery performance | | |
|---|---|---|---|
| | Cycle expansion rate | Capacity conservation rate after 1,000 cycles | 5C discharge capacity (Ah) |
| Comparative Example 1 | 2.5% | 76.4% | 145.1 |
| Comparative example 2 | 1.9% | 78% | 148.4 |
| Comparative example 3 | 2.0% | 77.8% | 147.3 |

From the above results, in Table 1, $\frac{w1}{m1}$ and $\frac{w2}{m2}$, reflect influences of the relative content relationship between the first polar substance and the positive binder and the relative content relationship between the second polar substance and the negative binder in the separator on the battery performance. In Examples 1-1 to 1-7, good results of the battery performances, such as the cycle expansion rate, the capacity conservation rate after 1,000 cycles and the 5 C discharge capacity, are obtained by adjusting $\frac{w1}{m1}$ and $\frac{w2}{m2}$, and particularly when $\frac{w1}{m1}$ is (80-100):1 and $\frac{w2}{m2}$ is (32-50):1, the battery performance is better.

In Table 2, $$\frac{w1}{w2}$$

reflects influences of a ratio of the relative content of the first polar substance in the first coating to the relative content of the second polar substance in the second coating in the separator on the battery performance. In Examples 2-1 to 2-4, good results of the battery performances, such as the cycle expansion rate, the capacity conservation rate after 1,000 cycles and the 5 C discharge capacity, are obtained by adjusting $$\frac{w1}{w2},$$

and particularly when $$\frac{w1}{w2}$$

is 1:(1-1.3), the battery performance is better.

In Table 3, when a value of $$\frac{w1}{w2}$$

is kept basically constant, in Examples 3-1 to 3-5, good results of the battery performances, such as the cycle expansion rate, the capacity conservation rate after 1,000 cycles and the 5 C discharge capacity, are obtained by comprehensively adjusting the mass content $w_1$ of the first polar substance in the first coating, the mass content $m_1$ of the positive binder in the positive film layer, the mass content $w_2$ of the second polar substance in the second coating, and the mass content $m_2$ of the negative binder in the negative film layer, and particularly when $m_1$ is within 1%-1.2% and $m_2$ is within 2%-3%, the battery performance is better.

In Table 4, in Examples 4-1 to 4-5, good results of the battery performances, such as the cycle expansion rate, the capacity conservation rate after 1,000 cycles and the 5 C discharge capacity, are obtained by adjusting the mass ratio of the mass content $k_1$ of the first reinforcing agent in the first coating to the mass content $k_2$ of the second reinforcing agent in the second coating, and particularly when $$\frac{k1}{k2}$$

is (0.8-1):1, the battery performance is better.

In Table 5, in Examples 5-1 to 5-7, by adjusting the mass ratio $$\frac{w1}{k1}$$

of the mass content $w_1$ of the first polar substance in the first coating to the mass content $k_1$ of the first reinforcing agent in the first coating, and the mass ratio $$\frac{w2}{k2}$$

of the mass content $w_2$ of the second polar substance in the second coating to the mass content $k_2$ of the second reinforcing agent in the second coating, the hydrogen bonds are easily formed between the reinforcing agents and the polar substances, and the expansion of the bare cell may be reduced, thereby improving the battery performance. Good results of the battery performances, such as the cycle expansion rate, the capacity conservation rate after 1,000 cycles and the 5 C discharge capacity, are obtained, and particularly when both $$\frac{w1}{k1}$$

and $$\frac{w2}{k2}$$

are (5-9):1, the battery performance is better.

In Table 6, Examples 6-1 to 6-5 reflect influences of the particle size of silicon on the battery performance. Good results of the battery performances, such as the cycle expansion rate, the capacity conservation rate after 1,000 cycles and the 5 C discharge capacity, are obtained, and particularly when the particle size of silicon ranges from 0.1 microns to 0.5 microns, the battery performance is better.

In Table 7, in Examples 7-1 to 7-4, the expansion of the bare cell may be significantly improved by adjusting the content of Ni in the ternary positive material, good results of the battery performances, such as the cycle expansion rate and the capacity conservation rate after 1,000 cycles, are obtained, and particularly the Ni content ranges from 0.5 to 0.9, the battery performance is better.

In Table 8, in Examples 8-1 to 8-7, good results of the battery performances, such as the cycle expansion rate, the capacity conservation rate after 1,000 cycles and the 5 C discharge capacity, are obtained by adjusting the mass ratio C1 of the polyethylene oxide to the polyacrylamide and the mass ratio C2 of the polyethylene imine to the polyethylene oxide, and particularly when values of C1 and C2 are (2-6):1, the battery performance is better.

In contrast, in Table 9, in Comparative Examples 1 to 3, the battery performances, such as the cycle expansion rate, the capacity conservation rate after 1,000 cycles and the 5 C discharge capacity, are not effectively improved.

Furthermore, as shown in FIG. 1, the first polar substance is PEO, the first reinforcing agent is PVDF, the positive binder is PEO, the second polar substance is PEI, the second reinforcing agent is PVDF, the negative binders are SA and SBR, and the negative active substance is a carbon-silicon mixture.

Between the positive electrode and the separator, F on the positive binder PVDF and H of the first polar substance PEO form a hydrogen bond.

In the first coating, F on the first reinforcing agent PVDF and H of the first polar substance PEO form a hydrogen bond.

Between the negative electrode and the separator, since electronegativity of N is lower than electronegativity of O which is lower than electronegativity of F, H on —OH in the carbon-silicon mixture is more electron-deficient than H of —NH$_2$, and therefore, the hydrogen bond is easily formed between N on —NH$_2$ in the second polar substance PEI and H on —OH in the carbon-silicon mixture. Similarly, a hydrogen bond is formed between N on —NH$_2$ in the second polar substance PEI and H on —COOH in the negative binder SA. A hydrogen bond may be formed between H on —OH in the carbon-silicon mixture and H on —COOH in SA.

In the second coating, a hydrogen bond is formed between F of the second reinforcing agent PVDF and H of the PEI.

Figure 2:
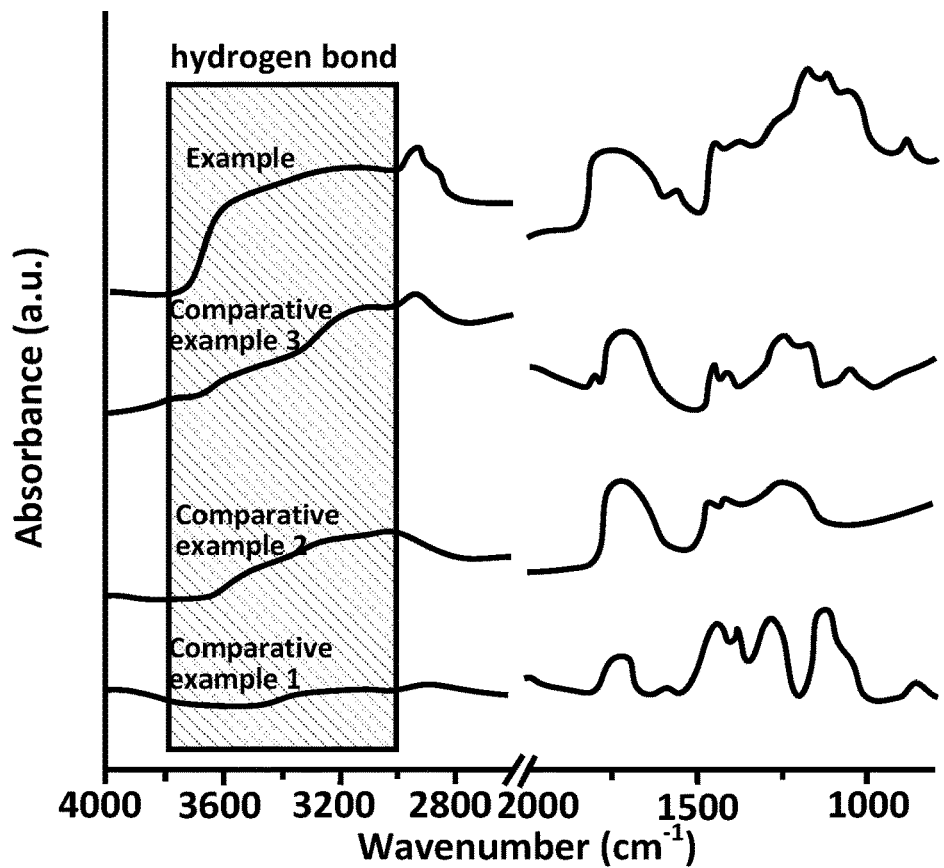
FIG. 2 is a schematic diagram of infrared characterization of Examples 1-4 and Comparative Examples 1-3 of the present disclosure.

As shown in FIG. 2, a peak of the hydrogen bond exists between 3,200 cm$^{-1}$ and 3,600 cm$^{-1}$, and when the first polar substance or the second polar substance is not added in Comparative Example 1, the hydrogen bond is hardly generated, but in Example 1, the peak is broad and obvious due to hydrogen bond connection on the surfaces A and B. In addition, it should be noted that four hydrogen bonds of O—H—O, F—H—O, N—H—O and F—H—N are ordered into F—H—O, F—H—N, O—H—O and N—H—O in a descending order of bond energy, the bond energy has a small difference between 25 KJ/mol and 40 KJ/mol, a plurality of hydrogen bonds exist in one wavenumber range, and normally, the more the hydrogen bonds are, the more the displayed peaks are, and the wider the peaks are.

It should be noted that the present disclosure is not limited to the above embodiments. The above-mentioned embodiments are merely examples, and embodiments having substantially the same configuration as the technical idea and exerting the same effects within the scope of the technical solution of the present disclosure are all included in the technical scope of the present disclosure. Furthermore, other embodiments configured by applying various modifications that can be conceived by those skilled in the art to the embodiments and combining some constituent elements in the embodiments are also included in the scope of the present disclosure without departing from the scope of the gist of the present disclosure.

What is claimed is:

1. A battery, comprising:
a positive electrode, a separator and a negative electrode, wherein the separator comprises a base film, a first coating provided on a first surface of the base film, and a second coating provided on a second surface of the base film, the positive electrode comprises a positive film layer, the negative electrode comprises a negative film layer, wherein
the first coating comprises a first polar substance, the first polar substance comprises polyethylene oxide and polyacrylamide, and hydrogen bonds are formed between the first polar substance and a positive binder of the positive film layer; and
the second coating comprises a second polar substance, the second polar substance comprises polyethylene imine and polyethylene oxide, and hydrogen bonds are formed between the second polar substance and a negative binder and/or a negative active component of the negative film layer,
wherein a peeling force between the first coating and the positive electrode is not lower than 0.075N; a peeling force between the second coating and the negative electrode is not lower than 0.075N;
the first polar substance has a mass content $w_1$ of 80%-90% in the first coating, and the positive binder has a mass content $m_1$ of 0.9%-1.2% in the positive film layer; and the second polar substance has a mass content $w_2$ of 80%-90% in the second coating, and the negative binder has a mass content $m_2$ of 2%-3% in the negative film layer.

2. The battery according to claim 1,
wherein the mass content $w_1$ of the first polar substance in the first coating and the mass content $m_1$ of the positive binder in a positive film layer have a ratio $$\frac{w1}{m1}$$

of (80-100):1; and
the mass content $w_2$ of the second polar substance in the second coating and the mass content $m_2$ of the negative binder in a negative film layer have a ratio $$\frac{w2}{m2}$$

of (32-50):1.

3. The battery according to claim 1,
wherein the mass content $w_1$ of the first polar substance in the first coating and the mass content $w_2$ of the second polar substance in the second coating have a ratio $$\frac{w1}{w2}$$

of 1:(1-1.3).

4. The battery according to claim 1,
the polyethylene oxide and the polyacrylamide have a mass ratio C1 of (2-6):1; and
the polyethylene imine and the polyethylene oxide have a mass ratio C2 of (2-6):1.

5. The battery according to claim 1,
wherein the first coating comprises a first reinforcing agent, and the mass content $w_1$ of the first polar substance in the first coating and a mass content $k_1$ of the first reinforcing agent in the first coating have a mass ratio $$\frac{w1}{k1}$$

of (5-9):1; and the second coating comprises a second reinforcing agent, and the mass content $w_2$ of the second polar substance in the second coating and a mass content $k_2$ of the second reinforcing agent in the second coating have a mass ratio $$\frac{w2}{k2}$$

of (5-9):1.

6. The battery according to claim 5,
wherein the mass content $k_1$ of the first reinforcing agent in the first coating is not higher than the mass content $k_2$ of the second reinforcing agent in the second coating.

7. The battery according to claim 6, wherein the mass content $k_1$ of the first reinforcing agent in the first coating and the mass content $k_2$ of the second reinforcing agent in the second coating have a ratio $$\frac{k1}{k2}$$

of (0.8-1):1.

8. The battery according to claim 7, wherein the first reinforcing agent or the second reinforcing agent comprises one or more of polyvinylidene difluoride and sodium alginate; and the positive binder comprises polyvinylidene difluoride, and the negative binder comprises more than one of styrene butadiene rubber and sodium alginate.

9. The battery according to claim 1, wherein the negative active component comprises a silicon-carbon mixture, silicon in the silicon-carbon mixture has a particle size of 0.1-0.5 microns, carbon in the silicon-carbon mixture is mixed carbon of artificial graphite and natural graphite, and the silicon-carbon mixture has a content of 95%-97% in the negative film layer.

10. The battery according to claim 1, wherein the first coating and the second coating have a mass ratio of 1:(1-1.5).

11. The battery according to claim 7, wherein the first coating is prepared from a first coating slurry, and the first coating slurry comprises the first polar substance, the first reinforcing agent and a first solvent,
wherein the first coating slurry has a viscosity of 8,000 mPa·s-12,000 mPa·s; and
the second coating is prepared from a second coating slurry, and the second coating slurry comprises the second polar substance, the second reinforcing agent and a second solvent;
wherein the second coating slurry has a viscosity of 5,000 mPa·s-20,000 mPa·s.

12. The battery according to claim 1, wherein the positive film layer comprises a positive material $LiNi_xCo_yMn_zO_2$, where x+y+z=1, and x=0.4-0.9.

13. A battery module, comprising the battery according to claim 1.

14. A battery pack, comprising the battery module according to claim 13.

15. The battery according to claim 1, wherein the first polar substance further comprises one or more of polyolefin imine, polyurethane, and polyurea.

16. The battery according to claim 1, wherein the second polar substance further comprises one or more of polyolefin amide, polyurethane, and polyurea.

* * * * *